US008838117B2

(12) United States Patent
Soliman et al.

(10) Patent No.: US 8,838,117 B2
(45) Date of Patent: *Sep. 16, 2014

(54) ACTIVE MACRO-FEMTO HAND-IN WITH HELP FROM OUT-OF-BAND PROXY

(75) Inventors: Samir S. Soliman, San Diego, CA (US);
Soumya Das, San Diego, CA (US);
Nishith Chaubey, San Diego, CA (US);
Olufunmilola O. Awoniyi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 13/087,760

(22) Filed: Apr. 15, 2011

(65) Prior Publication Data

US 2011/0263258 A1    Oct. 27, 2011

Related U.S. Application Data

(60) Provisional application No. 61/327,438, filed on Apr. 23, 2010.

(51) Int. Cl.
| | | |
|---|---|---|
| H04W 36/00 | (2009.01) | |
| H04W 4/00 | (2009.01) | |
| H04W 40/00 | (2009.01) | |
| H04L 12/28 | (2006.01) | |
| H04W 36/04 | (2009.01) | |
| H04W 84/18 | (2009.01) | |
| H04W 24/10 | (2009.01) | |
| H04W 36/08 | (2009.01) | |
| H04W 8/26 | (2009.01) | |
| H04W 84/04 | (2009.01) | |
| H04W 8/00 | (2009.01) | |

(52) U.S. Cl.
CPC .............. *H04W 36/04* (2013.01); *H04W 84/18* (2013.01); *H04W 24/10* (2013.01); *H04W 36/08* (2013.01); *H04W 8/26* (2013.01); *H04W 84/045* (2013.01); *H04W 8/005* (2013.01)
USPC .................... 455/444; 455/432.1; 455/435.3; 455/436; 455/437; 455/438; 455/439; 455/445; 370/331; 370/401

(58) Field of Classification Search
USPC ........... 455/436–439, 444, 432.1, 435.3, 445, 455/422.1; 370/331, 401
See application file for complete search history.

(56) References Cited

U.S. PATENT DOCUMENTS

| | | |
|---|---|---|
| 6,574,266 B1 | 6/2003 | Haartsen |
| 6,768,726 B2 | 7/2004 | Dorenbosch et al. |

(Continued)

FOREIGN PATENT DOCUMENTS

| | | |
|---|---|---|
| GB | 2444756 A | 6/2008 |
| JP | 2001320755 A | 11/2001 |

(Continued)

OTHER PUBLICATIONS

Femtocell Activities in 3$^{rd}$ Geberation Partnership Project (3GPP), Technical Specification Group (TSG), Radio Access Netwok (RAN), Working Group 2 (WG2), [online], Mar. 31, 2009, pp. 1-18.*

(Continued)

*Primary Examiner* — Inder Mehra
(74) *Attorney, Agent, or Firm* — Jeffrey D. Jacobs

(57) ABSTRACT

Systems, methods, devices, and computer program products are described for supporting macrocell-to-femtocell hand-ins of active macro communications for mobile access terminals. A femto-proxy system is provided including a femtocell and an out-of-band (OOB) proxy. While the femtocell may be addressed by the macro network according to a potentially non-unique identifier (e.g., its PN offset), the OOB proxy is addressable according to a unique OOB identifier (e.g., a Bluetooth device address, BD_ADDR). When the mobile access terminal is in proximity to the femto-proxy system, it detects the OOB proxy and communicates the unique OOB identifier to the core network via the macro network (e.g., as part of a measurement report). The OOB identifier is mapped (e.g., in the core network) to the femtocell, allowing the core network to uniquely identify the appropriate target femtocell for active hand-in.

44 Claims, 13 Drawing Sheets

(56) References Cited

U.S. PATENT DOCUMENTS

| | | | |
|---|---|---|---|
| 7,925,259 | B2 | 4/2011 | Nylander et al. |
| 8,086,236 | B2 | 12/2011 | Wu |
| 8,102,825 | B2 | 1/2012 | Kalhan |
| 8,180,368 | B2 | 5/2012 | Anderson et al. |
| 8,185,116 | B2 | 5/2012 | Wu |
| 8,204,481 | B2 | 6/2012 | Kone |
| 2005/0111409 | A1 | 5/2005 | Spear et al. |
| 2005/0186948 | A1 | 8/2005 | Gallagher et al. |
| 2006/0148485 | A1 | 7/2006 | Kangas et al. |
| 2006/0258323 | A1 | 11/2006 | Hara et al. |
| 2007/0037578 | A1 | 2/2007 | Besterman |
| 2008/0076386 | A1 | 3/2008 | Khetawat et al. |
| 2008/0076411 | A1 | 3/2008 | Khetawat et al. |
| 2008/0305801 | A1 | 12/2008 | Burgess et al. |
| 2009/0040972 | A1 | 2/2009 | Robson et al. |
| 2009/0044239 | A1 | 2/2009 | Cha |
| 2009/0082020 | A1* | 3/2009 | Ch'ng et al. ............... 455/435.3 |
| 2009/0092097 | A1 | 4/2009 | Nylander et al. |
| 2009/0098873 | A1 | 4/2009 | Gogic |
| 2009/0124235 | A1 | 5/2009 | Bosch et al. |
| 2009/0129341 | A1 | 5/2009 | Balasubramanian et al. |
| 2009/0156213 | A1* | 6/2009 | Spinelli et al. ................. 455/436 |
| 2009/0163216 | A1 | 6/2009 | Hoang et al. |
| 2009/0186615 | A1 | 7/2009 | Kwon et al. |
| 2009/0196253 | A1 | 8/2009 | Semper |
| 2009/0207805 | A1 | 8/2009 | Zou |
| 2009/0219888 | A1* | 9/2009 | Chen et al. ................... 370/331 |
| 2009/0247170 | A1* | 10/2009 | Balasubramanian et al. 455/445 |
| 2009/0286510 | A1 | 11/2009 | Huber et al. |
| 2009/0310568 | A1 | 12/2009 | Chen et al. |
| 2009/0325583 | A1 | 12/2009 | Burgess et al. |
| 2010/0029278 | A1* | 2/2010 | Fang et al. ................... 455/436 |
| 2010/0056132 | A1* | 3/2010 | Gallagher .................. 455/422.1 |
| 2010/0056160 | A1 | 3/2010 | Kim et al. |
| 2010/0120398 | A1 | 5/2010 | Chang et al. |
| 2010/0124927 | A1 | 5/2010 | Eskicioglu et al. |
| 2010/0144371 | A1 | 6/2010 | Savoor |
| 2010/0240365 | A1 | 9/2010 | Chen |
| 2010/0273432 | A1 | 10/2010 | Meshkati et al. |
| 2010/0273471 | A1 | 10/2010 | Meshkati et al. |
| 2010/0273473 | A1 | 10/2010 | Meshkati et al. |
| 2010/0273481 | A1 | 10/2010 | Meshkati et al. |
| 2010/0304741 | A1 | 12/2010 | Gogic et al. |
| 2010/0315974 | A1 | 12/2010 | Richardson et al. |
| 2010/0330903 | A1 | 12/2010 | Chabrerie |
| 2011/0085564 | A1* | 4/2011 | Taylor et al. ................... 370/401 |
| 2011/0170481 | A1 | 7/2011 | Gomes et al. |
| 2011/0171915 | A1 | 7/2011 | Gomes et al. |
| 2011/0189998 | A1 | 8/2011 | Joo et al. |
| 2011/0237269 | A1 | 9/2011 | Chen |
| 2011/0263242 | A1 | 10/2011 | Tinnakornsrisuphap et al. |
| 2012/0014267 | A1 | 1/2012 | Gomes et al. |
| 2012/0064903 | A1 | 3/2012 | Pani et al. |
| 2012/0083245 | A1 | 4/2012 | Adjakple et al. |
| 2012/0083280 | A1 | 4/2012 | Liu et al. |
| 2012/0094663 | A1 | 4/2012 | Awoniyi et al. |
| 2012/0094665 | A1 | 4/2012 | Soliman et al. |
| 2012/0094666 | A1 | 4/2012 | Awoniyi et al. |
| 2012/0106349 | A1 | 5/2012 | Adjakple et al. |
| 2012/0108234 | A1* | 5/2012 | Bao et al. ................... 455/432.1 |
| 2012/0115474 | A1 | 5/2012 | Lee et al. |
| 2012/0149362 | A1 | 6/2012 | Tooher et al. |
| 2012/0252435 | A1* | 10/2012 | Bienas et al. ............... 455/422.1 |
| 2012/0263145 | A1 | 10/2012 | Marinier et al. |
| 2012/0269095 | A1 | 10/2012 | Dalsgaard et al. |
| 2012/0322466 | A1 | 12/2012 | Das et al. |
| 2013/0003698 | A1 | 1/2013 | Olvera-Hernandez et al. |
| 2013/0017820 | A1 | 1/2013 | Drazynski et al. |

FOREIGN PATENT DOCUMENTS

| | | | | |
|---|---|---|---|---|
| JP | | 2006319878 A | | 11/2006 |
| JP | | 2009302977 A | | 12/2009 |
| JP | | 2010147682 A | | 7/2010 |
| WO | | WO2008055251 | | 5/2008 |
| WO | | WO2008088592 | | 7/2008 |
| WO | | WO 2009/120902 | * | 10/2009 ............. H04B 48/16 |
| WO | | WO2009120902 A1 | | 10/2009 |
| WO | | WO2009139675 A1 | | 11/2009 |
| WO | | WO2010009162 A1 | | 1/2010 |
| WO | | WO2011020481 A1 | | 2/2011 |
| WO | | WO2011028954 A1 | | 3/2011 |
| WO | | WO-2011093531 A1 | | 8/2011 |

OTHER PUBLICATIONS

Femtocell Activities in 3rd Geberation Partnership Project (3GPP), Technical Specification Group (TSG), Radio Access Netwok (RAN), Working Group 2 (WG2), [online], Mar. 31, 2009, pp. 1-18.*

Anonymous: "Interoperability Specification (IOS) for Femtocell Access Points", 3GGP2 3GGP2 A.S0024-0 vl.O, Mar. 1, 2010, p. 64PP, XP002659293, Retrieved from the Internet: URL:http://www.3gpp2.org/publi      cjitml/specs      /A.S0024-0_vl.0_100302.pdf [retrieved on Sep. 16, 2011].

Anonymous: "Interoperability Specification (IOS) for Femtocell Access Points", 3GPP2 3GGP2 A.S0024-A vl.O, Apr. 1, 2011, p. 128PP, XP002650581, Retrieved from the Internet: URL:http://www.3gpp2.org/public      html/specs      /A.S0024-A%20vl.0%20Femto%20IOS-Pub 201104 .pdf [retrieved on Jul. 15, 2011].

International Search Report and Written Opinion—PCT/US2011/033651, ISA/EPO—Jul. 5, 2011.

Tiedemann E G: "Femtocell Activities in 3GPP2 TSG-C", 3rd Generation Partnership Project (3GPP) ; TechnicalSpecification Group (TSG).

Tiedemann E G: "Femtocell Activities in 3GPP2 TSG-C", 3RD Generation Partnership Project (3GPP); Technicalspecification Group (TSG) Radio Access Network (RAN); Working Group 2 (WG2), XX, XX Mar. 31, 2009, pp. 1-18, XP002599307, Retrieved from the Internet: URL:fftp://ftp.3gpp2.org/TSGX/Working/2009 /2009-03-New%200rleans/A11%2OTSG%20Femto%20Discussion/XS1-20090331-004—TSG-C Femto%200 Overview-090330.p [retrieved on Sep. 2, 2010].

Airvana, Qualcomm: "Active Call Hand-in in cdma2000 1x", A20-20081027-008r0, 3GPP2, Oct. 27, 2008, p. 7.

Telefonica: "Dynamic H(e)NB Switching by Means of a Low Power Radio Interface for Energy Savings and Interference Reduction", R3-110030,3GPP, Jan. 21, 2011, pp. 1-5.

* cited by examiner

ACTIVE MACRO-FEMTO HAND-IN WITH HELP FROM OUT-OF-BAND PROXY

CLAIM OF PRIORITY

The present application claims the benefit of U.S. Provisional Application No. 61/327,438, filed Apr. 23, 2010, entitled "Method for uniquely identifying target femtocell to facilitate macro to femto active hand-in" and assigned to the assignee hereof and herein incorporated by reference for all purposes.

BACKGROUND

Information communication provided by various forms of networks is in wide use in the world today. Networks having multiple nodes in communication using wireless and wireline links are used, for example, to carry voice and/or data. The nodes of such networks may be computers, personal digital assistants (PDAs), phones, servers, routers, switches, multiplexers, modems, radios, access points, base stations, etc. Many client device nodes (also referred to as user equipment (UE) or access terminals (ATs)), such as cellular phones, PDAs, laptop computers, etc. are mobile and thus may connect with a network through a number of different interfaces.

Mobile client devices may connect with a network wirelessly via a base station, access point, wireless router, etc. (collectively referred to herein as access points). A mobile client device may remain within the service area of such an access point for a relatively long period of time (referred to as being "camped on" the access point) or may travel relatively rapidly through access point service areas, with cellular handoff or reselection techniques being used for maintaining a communication session or for idle mode operation as association with access points is changed.

Issues with respect to available spectrum, bandwidth, capacity, etc. may result in a network interface being unavailable or inadequate between a particular client device and access point. Moreover, issues with respect to wireless signal propagation, such as shadowing, multipath fading, interference, etc. may result in a network interface being unavailable or inadequate between a particular client device and access point.

Cellular networks have employed the use of various cell types, such as macrocells, microcells, picocells, and femtocells, to provide desired bandwidth, capacity, and wireless communication coverage within service areas. For example, the use of femtocells is often desirable to provide wireless communication in areas of poor network coverage (e.g., inside of buildings), to provide increased network capacity, to utilize broadband network capacity for backhaul, etc.

SUMMARY

The present disclosure is directed to systems and methods for supporting macrocell-to-femtocell hand-ins of active macro communications for mobile access terminals. A femto-proxy system is provided including a femtocell and an out-of-band (OOB) proxy. While the femtocell may be addressed by the macro network according to a potentially non-unique identifier (e.g., its PN offset), the OOB proxy is addressable according to a unique OOB identifier (e.g., a Bluetooth device address, BD_ADDR). When the mobile access terminal is in proximity to the femto-proxy system, it detects the OOB proxy and communicates the unique OOB identifier to the core network via the macro network. The OOB identifier is mapped (e.g., in the core network) to the femtocell of the femto-proxy system. Accordingly, the core network can uniquely identify the appropriate target femtocell for active hand-in.

An exemplary method for macrocell-to-femtocell hand-in includes: detecting a femto-proxy system with an access terminal while the access terminal is communicatively coupled with a macro network via a macrocell, the femto-proxy system including an out-of-band (OOB) femto-proxy having a corresponding OOB identifier and having a femtocell communicatively coupled with the macro network and having a femtocell identifier; detecting, with the access terminal, the OOB identifier corresponding to the OOB femto-proxy; and communicating a measurement message to the macro network from the access terminal, the measurement message including the OOB identifier, the femtocell identifier, and a link measurement for a communications link between the access terminal and the femtocell. For example, the link measurement may be a signal strength measurement, the femtocell identifier may be a PN offset of the femtocell, the OOB identifier may be a Bluetooth device address of the OOB femto-proxy, and/or the OOB identifier may be a media access control (MAC) address of the OOB femto-proxy.

Some such methods further include receiving a handoff request at the access terminal from the macro network, the handoff request being generated by the macro network according to the measurement message and directing the access terminal to handoff active communications with the macro network from the macrocell to the femtocell.

Also or alternatively, according to some such methods, detecting the femto-proxy system with the access terminal includes detecting the OOB femto-proxy over an OOB communications link (e.g., a Bluetooth link). Also or alternatively, according to some such methods, communicating the measurement message to the macro network from the access terminal includes communicating the measurement message to a femto convergence server in communication with the macro network. Also or alternatively, according to some such methods, the femtocell is one of a number of femtocells in communication with the macro network and addressable by the macro network according to a non-unique femtocell identifier, such that at least one femtocell identifier corresponds to multiple of the femtocells in communication with the macro network. Also or alternatively, according to some such methods, the macro network is configured to maintain, for each of a number of femto-proxy systems associated with the macro network, a mapping between the femtocell identifier corresponding to the respective femtocell and the OOB identifier corresponding to the respective OOB femto-proxy.

An exemplary access terminal includes: a macro communications subsystem configured to communicatively couple with a macro network via a macrocell or via a femtocell having a femtocell identifier; an out-of-band (OOB) communications subsystem, communicatively coupled with the macro communications subsystem, and configured to communicatively couple with an OOB femto-proxy having an OOB identifier; and a communications management subsystem, communicatively coupled with the macro communications subsystem and the OOB communications subsystem, and configured to: detect a femto-proxy system while the macro communications subsystem is communicatively coupled with the macro network via the macrocell, the femto-proxy system including the OOB femto-proxy and the femtocell; detect the OOB identifier corresponding to the OOB femto-proxy using the OOB communications subsystem; and communicate a measurement message to the macro network, the measurement message including the OOB identifier, the femtocell identifier, and a link measurement for a communications link between the macro communications subsystem and the femtocell.

According to some such access terminals, the communications management subsystem is further configured to receive a handoff request from the macro network, the handoff request being generated by the macro network according to the measurement message and directing the communications management subsystem to handoff active communications with the macro network from the macrocell to the femtocell. Also or alternatively, the communications management subsystem is configured to detect the femto-proxy system by detecting the OOB femto-proxy over an OOB communications link using the OOB communications subsystem. Also or alternatively, the femtocell is one of a number of femtocells in communication with the macro network and addressable by the macro network according to a non-unique femtocell identifier, such that at least one femtocell identifier corresponds to multiple of the femtocells in communication with the macro network.

An exemplary processor for macrocell-to-femtocell hand-in in an access terminal includes: a macro communications controller configured to communicatively couple with a macro network via a macrocell or via a femtocell having a femtocell identifier; an out-of-band (OOB) communications controller, communicatively coupled with the macro communications controller, and configured to communicatively couple with an OOB femto-proxy having an OOB identifier; and a communications management controller, communicatively coupled with the macro communications controller and the OOB communications controller, and configured to: detect a femto-proxy system while the macro communications controller is communicatively coupled with the macro network via the macrocell, the femto-proxy system including the OOB femto-proxy and the femtocell; detect the OOB identifier corresponding to the OOB femto-proxy using the OOB communications controller; and communicate a measurement message to the macro network, the measurement message including the OOB identifier, the femtocell identifier, and a link measurement for a communications link between the macro communications controller and the femtocell.

An exemplary computer program product residing on a processor-readable medium and including processor-readable instructions, when executed, causes a processor to perform steps including: detecting a femto-proxy system with an access terminal while the access terminal is communicatively coupled with a macro network via a macrocell, the femto-proxy system including an out-of-band (OOB) femto-proxy having a corresponding OOB identifier and including a femtocell communicatively coupled with the macro network and having a femtocell identifier; detecting, with the access terminal, the OOB identifier corresponding to the OOB femto-proxy; and communicating a measurement message to the macro network from the access terminal, the measurement message including the OOB identifier, the femtocell identifier, and a link measurement for a communications link between the access terminal and the femtocell.

An exemplary system for macrocell-to-femtocell hand-in includes: means for detecting a femto-proxy system with an access terminal while the access terminal is communicatively coupled with a macro network via a macrocell, the femto-proxy system including an out-of-band (OOB) femto-proxy having a corresponding OOB identifier and including a femtocell communicatively coupled with the macro network and having a femtocell identifier; means for detecting, with the access terminal, the OOB identifier corresponding to the OOB femto-proxy; and means for communicating a measurement message to the macro network from the access terminal, the measurement message including the OOB identifier, the femtocell identifier, and a link measurement for a communications link between the access terminal and the femtocell.

Another exemplary method for macrocell-to-femtocell hand-in includes: receiving a measurement message at a network management system of a core network from an access terminal communicatively coupled with the core network via a macrocell of a macro network, the measurement message including an OOB identifier of an OOB femto-proxy, a femtocell identifier of a femtocell, and a link measurement for a communications link between the access terminal and the femtocell, the femtocell being associated with the OOB femto-proxy as part of a femto-proxy system; uniquely identifying the femtocell from a number of femtocells in communication with the macro network according to a mapping between the femtocell identifier and the OOB identifier maintained by the network management system; determining, according to the measurement message, whether to direct the access terminal to handoff communications from the macrocell to the femtocell; and communicating a handoff request from the network management system to the femtocell when it is determined to direct the access terminal to handoff communications from the macrocell to the femtocell.

Some such methods further include receiving an acknowledgement message from the femtocell in response to the handoff request. Some such methods further include determining whether the femtocell can be uniquely identified by the femtocell identifier alone; and uniquely identifying the femtocell by the femtocell identifier when the femtocell can be uniquely identified by the femtocell identifier alone, wherein the femtocell is uniquely identified from the number of femtocells of the macro network according to the mapping between the femtocell identifier and the OOB identifier only when the femtocell cannot be uniquely identified by the femtocell identifier alone.

Also or alternatively, the femtocell is physically integrated with the OOB femto-proxy as part of the femto-proxy system. Also or alternatively, the network management system includes a femto convergence server. Also or alternatively, the mapping between the femtocell identifier and the OOB identifier is maintained by the network management system.

An exemplary network management system disposed in a core network in communication with a number of macrocells and a number of femtocells includes: a data storage subsystem configured to maintain, for each of a number of femto-proxy systems associated with a macro network in communication with the core network, a mapping between a femtocell identifier corresponding to a femtocell of the femto-proxy system and an out-of-band (OOB) identifier corresponding to an OOB femto-proxy of the femto-proxy system; and a communications management subsystem, communicatively coupled with the data storage subsystem, and configured to: receive a measurement message from an access terminal communicatively coupled with the macro network via a source macrocell of the number of macrocells, the measurement message including a target OOB identifier, a target femtocell identifier, and a link measurement for a communications link between the access terminal and a target femtocell of the number of femtocells; uniquely identify the target femtocell according to the mapping between the target femtocell identifier and the target OOB identifier maintained by the data storage subsystem; determine, according to the measurement message, whether to direct the access terminal to handoff communications from the source macrocell to the target femtocell; and communicate a handoff request from the network management system to the target femtocell when it is determined to direct the access terminal to handoff communications from the source macrocell to the target femtocell.

An exemplary processor for macrocell-to-femtocell hand-in in a network management system disposed in a core network communicatively coupled with a number of macrocells and a number of femtocells includes: a communications management controller, communicatively coupled with a data store configured to maintain, for each of a number of femto-proxy systems associated with a macro network, a mapping between a femtocell identifier corresponding to a femtocell of the femto-proxy system and an out-of-band (OOB) identifier corresponding to an OOB femto-proxy of the femto-proxy system, the communications management controller configured to: receive a measurement message from an access terminal communicatively coupled with the macro network via a source macrocell of the number of macrocells, the measurement message including a target OOB identifier, a target femtocell identifier, and a link measurement for a communications link between the access terminal and a target femtocell of the number of femtocells; uniquely identify the target femtocell according to the mapping between the target femtocell identifier and the target OOB identifier maintained by the data storage subsystem; determine, according to the measurement message, whether to direct the access terminal to handoff communications from the source macrocell to the target femtocell; and communicate a handoff request from the network management system to the target femtocell when it is determined to direct the access terminal to handoff communications from the source macrocell to the target femtocell.

An exemplary computer program product residing on a processor-readable medium and including processor-readable instructions, when executed, causes a processor to perform steps including: receiving a measurement message at a network management system of a core network from an access terminal communicatively coupled with the core network via a macrocell of a macro network, the measurement message including an OOB identifier of an OOB femto-proxy, a femtocell identifier of a femtocell, and a link measurement for a communications link between the access terminal and the femtocell, the femtocell being associated with the OOB femto-proxy as part of a femto-proxy system; uniquely identifying the femtocell from a number of femtocells of the macro network according to a mapping between the femtocell identifier and the OOB identifier maintained by the network management system; determining, according to the measurement message, whether to direct the access terminal to handoff communications from the macrocell to the femtocell; and communicating a handoff request from the network management system to the femtocell when it is determined to direct the access terminal to handoff communications from the macrocell to the femtocell.

Another exemplary system for macrocell-to-femtocell hand-in includes: means for receiving a measurement message at a network management system of a core network from an access terminal communicatively coupled with the core network via a macrocell of a macro network, the measurement message including an OOB identifier of an OOB femto-proxy, a femtocell identifier of a femtocell, and a link measurement for a communications link between the access terminal and the femtocell, the femtocell being associated with the OOB femto-proxy as part of a femto-proxy system; means for uniquely identifying the femtocell from a number of femtocells according to a mapping between the femtocell identifier and the OOB identifier maintained by the network management system; means for determining, according to the measurement message, whether to direct the access terminal to handoff communications from the macrocell to the femtocell; and means for communicating a handoff request from the network management system to the femtocell when it is determined to direct the access terminal to handoff communications from the macrocell to the femtocell.

The foregoing has outlined rather broadly the features and technical advantages of examples according to disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

A further understanding of the nature and advantages of examples provided by the disclosure may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

DETAILED DESCRIPTION

Figure 1:
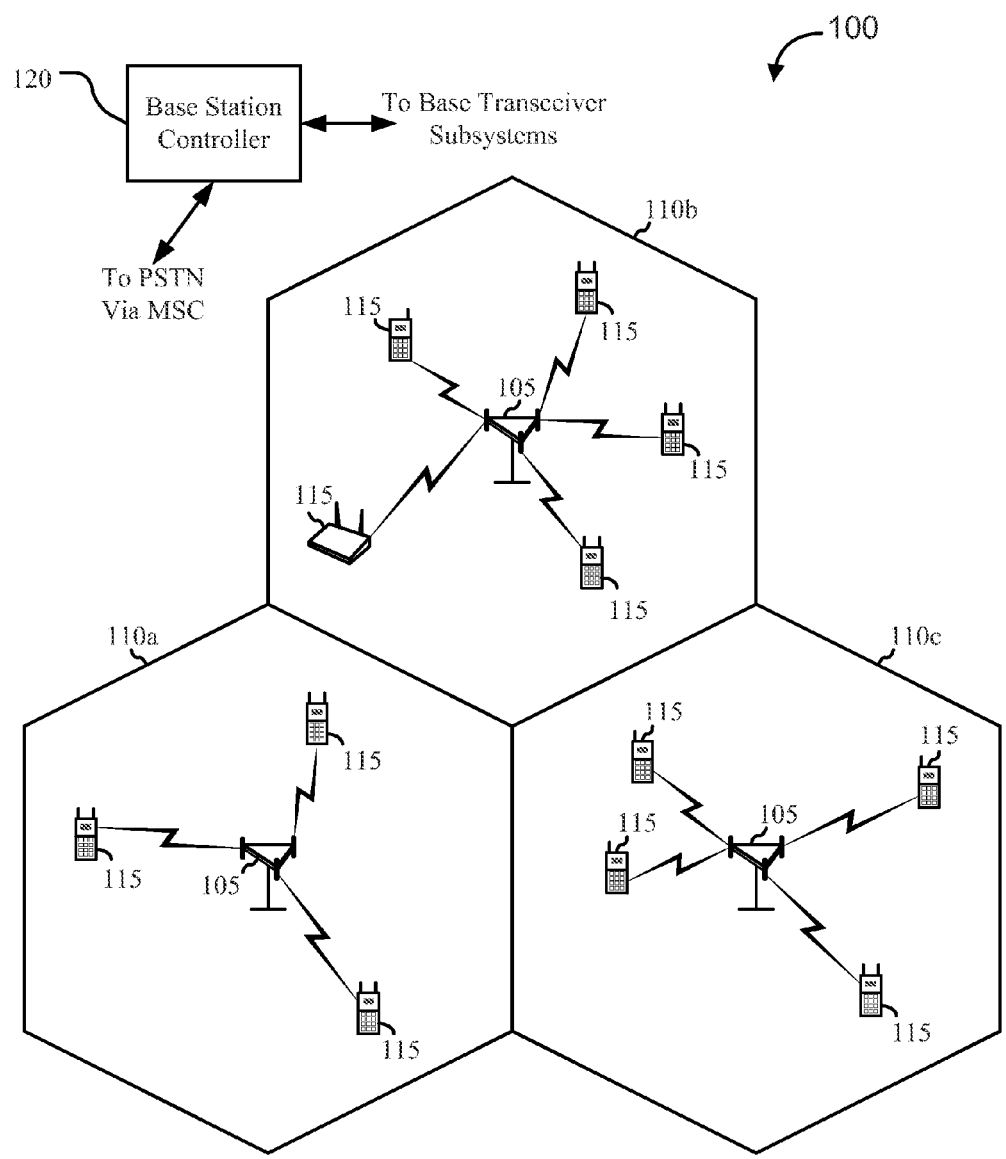
FIG. 1 shows a block diagram of a wireless communications system.

Typically, a femtocell is identified by the macro network according to a potentially non-unique identifier (e.g., a PN offset). A mobile device in proximity to the femtocell may detect the femtocell, and the macro network may direct a handoff of the mobile device's active communications from a current macrocell to the femtocell. If neighboring cells (e.g., other nearby femtocells) are associated with the same PN offset, it may be difficult or impossible to reliably determine the target femtocell. The handoff may be made to the wrong cell, which may cause the active communications to be lost (e.g., a call to be dropped).

Accordingly, a femto-proxy system is provided including a femtocell and an out-of-band (OOB) proxy. While the femtocell may be addressed by the macro network according to a potentially non-unique identifier (e.g., its PN offset), the OOB proxy is addressable according to a unique OOB identifier (e.g., a Bluetooth device address, BD_ADDR). When the mobile access terminal is in proximity to the femto-proxy system, it detects the OOB proxy and communicates the unique OOB identifier to the core network via the macro network. The OOB identifier is mapped (e.g., in the core network) to the femtocell of the femto-proxy system. Accordingly, the core network can uniquely identify the appropriate target femtocell for active hand-in.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above, as well as for other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various operations may be added, omitted, or combined. Also, features described with respect to certain examples may be combined in other examples.

Referring first to FIG. 1, a block diagram illustrates an example of a wireless communications system 100. The system 100 includes base transceiver stations (BTSs) 105, disposed in cells 110, mobile access terminals 115 (ATs), and a base station controller (BSC) 120. It is worth noting that terminology like access terminal (AT), mobile station (MS), and others are used interchangeably herein and are not intended to imply a particular network topology or implementation. For example, while the "MS" terminology may typically be used for circuit switched (e.g., CDMA 1X) networks, and the "AT" terminology may typically be used for packet data service (e.g., EV-DO, HRPD) networks, the techniques described herein may be applied in the context of any of these or other networks.

The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a SC-FDMA signal, etc. Each modulated signal may be sent on a different carrier and may carry pilot, overhead information, data, etc. The system 100 may be a multi-carrier LTE network capable of efficiently allocating network resources.

The BTSs 105 can wirelessly communicate with the ATs 115 via a base station antenna. The BTSs 105 are configured to communicate with the ATs 115 under the control of the BSC 120 via multiple carriers. Each of the BTSs 105 can provide communication coverage for a respective geographic area, here the cell 110-*a*, 110-*b*, or 110-*c*. The system 100 may include BTSs 105 of different types, e.g., macro, pico, and/or femto base stations.

The ATs 115 can be dispersed throughout the cells 110. The ATs 115 may be referred to as mobile stations, mobile devices, user equipment (UE), or subscriber units. The ATs 115 here include cellular phones and a wireless communication device, but can also include personal digital assistants (PDAs), other handheld devices, netbooks, notebook computers, etc.

For the discussion below, the ATs 115 operate on (are "camped" on) a macro or similar network facilitated by multiple "macro" BTSs 105. Each macro BTS 105 may cover a relatively large geographic area (e.g., several kilometers in radius) and may allow unrestricted access by terminals with service subscription. The ATs 115 are also registered to operate on at least one femto network facilitated by a "femto" or "home" BTS 105. It will be appreciated that, while the macro BTSs 105 may typically be deployed according to network planning (e.g., resulting in the illustrative hexagonal cells 110 shown in FIG. 1), a femto BTS 105 may typically be deployed by individual users (or user representatives) to create a localized femtocell. The localized femtocell does not typically follow the macro network planning architecture (e.g., the hexagonal cells), although it may be accounted for as part of various macro-level network planning and/or management decisions (e.g., load balancing, etc.).

The AT 115 may generally operate using an internal power supply, such as a small battery, to facilitate highly mobile operations. Strategic deployment of network devices, such as femtocells, can mitigate mobile device power consumption to some extent. For example, femtocells may be utilized to provide service within areas which might not otherwise experience adequate or even any service (e.g., due to capacity limitations, bandwidth limitations, signal fading, signal shadowing, etc.), thereby allowing client devices to reduce searching times, to reduce transmit power, to reduce transmit times, etc. Femtocells provide service within a relatively small service area (e.g., within a house or building). Accordingly, a client device is typically disposed near a femtocell when being served, often allowing the client device to communicate with reduced transmission power.

For example, the femto cell is implemented as a femto access point (FAP) located in a user premises, such as a residence, an office building, etc. The location may be chosen for maximum coverage (e.g., in a centralized location), to allow access to a global positioning satellite (GPS) signal (e.g., near a window), and/or in any other useful location. For the sake of clarity, the disclosure herein assumes that a set of ATs 115 are registered for (e.g., on a whitelist of) a single FAP that provides coverage over substantially an entire user premises. The "home" FAP provides the ATs 115 with access to communication services over the macro network. As used herein, the macro network is assumed to be a wireless wide-area network (WWAN). As such, terms like "macro network" and "WWAN network" are interchangeable. Similar techniques may be applied to other types of network environments without departing from the scope of the disclosure or claims.

In example configurations, the FAP is integrated with one or more out-of-band (OOB) proxies as a femto-proxy system. As used herein, "out-of-band," or "OOB," includes any type of communications that are out of band with respect to the WWAN link. For example, the OOB proxies and/or the ATs 115 may be configured to operate using Bluetooth (e.g., class 1, class 1.5, and/or class 2), ZigBee (e.g., according to the IEEE 802.15.4-2003 wireless standard), WiFi, and/or any other useful type of communications out of the macro network band. Notably, OOB integration with the FAP may provide a number of features, including, for example, reduced interference, lower power femto discovery, etc.

Further, the integration of OOB functionality with the FAP may allow the ATs 115 attached to the FAP to also be part of an OOB piconet. The piconet may facilitate enhanced FAP functionality, other communications services, power management functionality, and/or other features to the ATs 115. These and other features will be further appreciated from the description below.

Figure 2A:
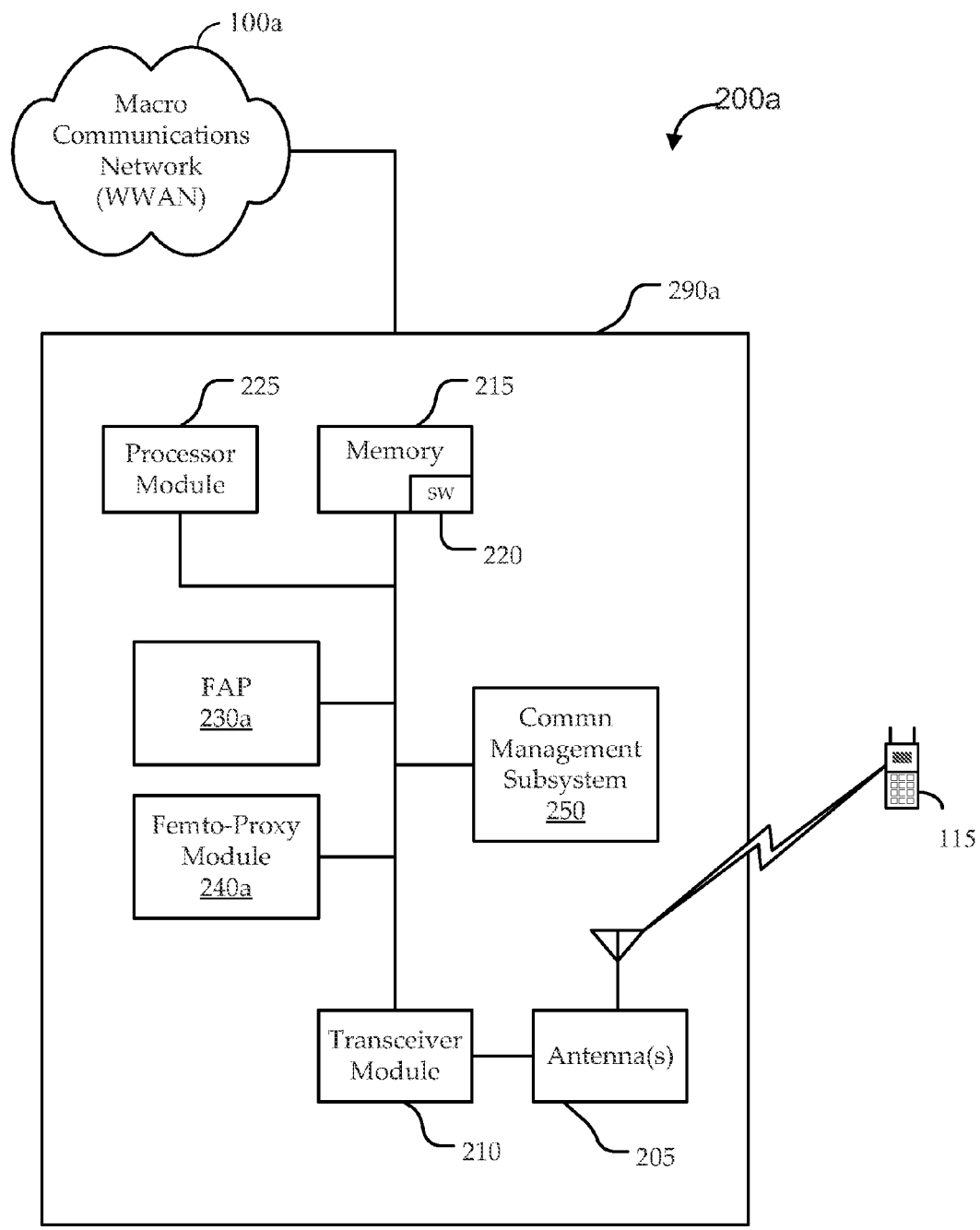
FIG. 2A shows a block diagram of an exemplary wireless communications system that includes a femto-proxy system.

FIG. 2A shows a block diagram of a wireless communications system 200a that includes a femto-proxy system 290a. The femto-proxy system 290a includes a femto-proxy module 240a, an FAP 230a, and a communications management subsystem 250. The FAP 230a may be a femto BTS 105, as described with reference to FIG. 1. The femto-proxy system 290a also includes antennas 205, a transceiver module 210, memory 215, and a processor module 225, which each may be in communication, directly or indirectly, with each other (e.g., over one or more buses). The transceiver module 210 is configured to communicate bi-directionally, via the antennas 205, with the ATs 115. The transceiver module 210 (and/or other components of the femto-proxy system 290a) is also configured to communicate bi-directionally with a macro communications network 100a (e.g., a WWAN). For example, the transceiver module 210 is configured to communicate with the macro communications network 100a via a backhaul network. The macro communications network 100a may be the communications system 100 of FIG. 1.

The memory 215 may include random access memory (RAM) and read-only memory (ROM). The memory 215 may also store computer-readable, computer-executable software code 220 containing instructions that are configured to, when executed, cause the processor module 225 to perform various functions described herein (e.g., call processing, database management, message routing, etc.). Alternatively, the software 220 may not be directly executable by the processor module 225, but may be configured to cause the computer, e.g., when compiled and executed, to perform functions described herein.

The processor module 225 may include an intelligent hardware device, e.g., a central processing unit (CPU) such as those made by Intel® Corporation or AMD®, a microcontroller, an application specific integrated circuit (ASIC), etc. The processor module 225 may include a speech encoder (not shown) configured to receive audio via a microphone, convert the audio into packets (e.g., 30 ms in length) representative of the received audio, provide the audio packets to the transceiver module 210, and provide indications of whether a user is speaking. Alternatively, an encoder may only provide packets to the transceiver module 210, with the provision or withholding/suppression of the packet itself providing the indication of whether a user is speaking.

The transceiver module 210 may include a modem configured to modulate the packets and provide the modulated packets to the antennas 205 for transmission, and to demodulate packets received from the antennas 205. While some examples of the femto-proxy system 290a may include a single antenna 205, the femto-proxy system 290a preferably includes multiple antennas 205 for multiple links. For example, one or more links may be used to support macro communications with the ATs 115. Also, one or more out-of-band links may be supported by the same antenna 205 or different antennas 205.

Notably, the femto-proxy system 290a is configured to provide both FAP 230a and femto-proxy module 240a functionality. For example, when the AT 115 approaches the femtocell coverage area, the AT's 115 OOB radio may begin searching for the OOB femto-proxy module 240a. Upon discovery, the AT 115 may have a high level of confidence that it is in proximity to the femtocell coverage area, and a scan for the FAP 230a can commence.

The scan for the FAP 230a may be implemented in different ways. For example, due to the femto-proxy module 240a discovery by the AT's 115 OOB radio, both the AT 115 and the femto-proxy system 290a may be aware of each other's proximity. The AT 115 scans for the FAP 230a. Alternatively, the FAP 230a polls for the AT 115 (e.g., individually, or as part of a round-robin polling of all registered ATs 115), and the AT 115 listens for the poll. When the scan for the FAP 230a is successful, the AT 115 may attach to the FAP 230a.

When the AT 115 is in the femtocell coverage area and attached to the FAP 230a, the AT 115 may be in communication with the macro communications network 100a via the FAP 230a. As described above, the AT 115 may also be a slave of a piconet for which the femto-proxy module 240a acts as the master. For example, the piconet may operate using Bluetooth and may include Bluetooth communications links facilitated by a Bluetooth radio (e.g., implemented as part of the transceiver module 210) in the FAP 230a.

Examples of the FAP 230a have various configurations of base station or wireless access point equipment. As used herein, the FAP 230a may be a device that communicates with various terminals (e.g., client devices (ATs 115, etc.), proximity agent devices, etc.) and may also be referred to as, and include some or all the functionality of, a base station, a Node B, and/or other similar devices. Although referred to herein as the FAP 230a, the concepts herein are applicable to access point configurations other than femtocell configuration (e.g., picocells, microcells, etc.). Examples of the FAP 230a utilize communication frequencies and protocols native to a corresponding cellular network (e.g., the macro communications network 100a, or a portion thereof) to facilitate communication within a femtocell coverage area associated with the FAP 230a (e.g., to provide improved coverage of an area, to provide increased capacity, to provide increased bandwidth, etc.).

The FAP 230a may be in communication with other interfaces not explicitly shown in FIG. 2A. For example, the FAP 230a may be in communication with a native cellular interface as part of the transceiver module 210 (e.g., a specialized transceiver utilizing cellular network communication techniques that may consume relatively large amounts of power in operation) for communicating with various appropriately configured devices, such as the AT 115, through a native cellular wireless link (e.g., an "in band" communication link). Such a communication interface may operate according to various communication standards, including but not limited to wideband code division multiple access (W-CDMA), CDMA2000, global system for mobile telecommunication (GSM), worldwide interoperability for microwave access (WiMax), and wireless LAN (WLAN). Also or alternatively, the FAP 230a may be in communication with one or more backend network interfaces as part of the transceiver module 210 (e.g., a backhaul interface providing communication via the Internet, a packet switched network, a switched network, a radio network, a control network, a wired link, and/or the like) for communicating with various devices or other networks.

As described above, the FAP 230a may further be in communication with one or more OOB interfaces as part of the transceiver module 210 and/or the femto-proxy module 240a. For example, the OOB interfaces may include transceivers that consume relatively low amounts of power in operation and/or may cause less interference in the in-band spectrum with respect to the in-band transceivers. Such an OOB interface may be utilized according to embodiments to provide low power wireless communications with respect to various appropriately configured devices, such as an OOB radio of the AT 115. The OOB interface may, for example, provide a Bluetooth link, an ultra-wideband (UWB) link, an IEEE 802.11 (WLAN) link, etc.

The terms "high power" and "low power" as used herein are relative terms and do not imply a particular level of power consumption. Accordingly, OOB devices (e.g., OOB femto-proxy module 240a) may simply consume less power than native cellular interface (e.g., for macro WWAN communications) for a given time of operation. In some implementations, OOB interfaces also provide relatively lower bandwidth communications, relatively shorter range communication, and/or consume relatively lower power in comparison to the macro communications interfaces. There is no limitation that the OOB devices and interfaces be low power, short range, and/or low bandwidth. Devices may use any suitable out-of-band link, whether wireless or otherwise, such as IEEE 802.11, Bluetooth, PEANUT, UWB, ZigBee, an IP tunnel, a wired link, etc. Moreover, devices may utilize virtual OOB links, such as through use of IP based mechanisms over a wireless wide area network (WWAN) link (e.g., IP tunnel over a WWAN link) that act as a virtual OOB link.

Femto-proxy modules 240a may provide various types of OOB functionality and may be implemented in various ways. A femto-proxy module 240a may have any of various configurations, such as a stand-alone processor-based system, a processor-based system integrated with a host device (e.g., access point, gateway, router, switch, repeater, hub, concentrator, etc.), etc. For example, the femto-proxy modules 240a may include various types of interfaces for facilitating various types of communications.

Some femto-proxy modules 240a include one or more OOB interfaces as part of the transceiver module 210 (e.g., a transceiver that may consume relatively low amounts of power in operation and/or may cause less interference than in the in-band spectrum) for communicating with other appropriately configured devices (e.g., an AT 115) for providing interference mitigation and/or femtocell selection herein through a wireless link. One example of a suitable communication interface is a Bluetooth-compliant transceiver that uses a time-division duplex (TDD) scheme.

Femto-proxy modules 240a may also include one or more backend network interfaces as part of the transceiver module 210 (e.g., packet switched network interface, switched network interface, radio network interface, control network interface, a wired link, and/or the like) for communicating with various devices or networks. A femto-proxy module 240a that is integrated within a host device, such as with FAP 230a, may utilize an internal bus or other such communication interface in the alternative to a backend network interface to provide communications between the femto-proxy module 240a and other devices, if desired. Additionally or alternatively, other interfaces, such as OOB interfaces, native cellular interfaces, etc., may be utilized to provide communication between the femto-proxy module 240a and the FAP 230a and/or other devices or networks.

Various communications functions (e.g., including those of the FAP 230a and/or the femto-proxy module 240a) may be managed using the communications management subsystem 250. For example, the communications management subsystem 250 may at least partially handle communications with the macro (e.g., WWAN) network, one or more OOB networks (e.g., piconets, AT 115 OOB radios, other femto-proxies, OOB beacons, etc.), one or more other femtocells (e.g., FAPs 230), ATs 115, etc. For example, the communications management subsystem 250 may be a component of the femto-proxy system 290a in communication with some or all of the other components of the femto-proxy system 290a via a bus.

Various other architectures are possible other than those illustrated by FIG. 2A. The FAP 230a and femto-proxy module 240a may or may not be collocated, integrated into a single device, configured to share components, etc. For example, the femto-proxy system 290a of FIG. 2A has an integrated FAP 230a and femto-proxy module 240a that at least partially share components, including the antennas 205, the transceiver module 210, the memory 215, and the processor module 225.

Figure 2B:
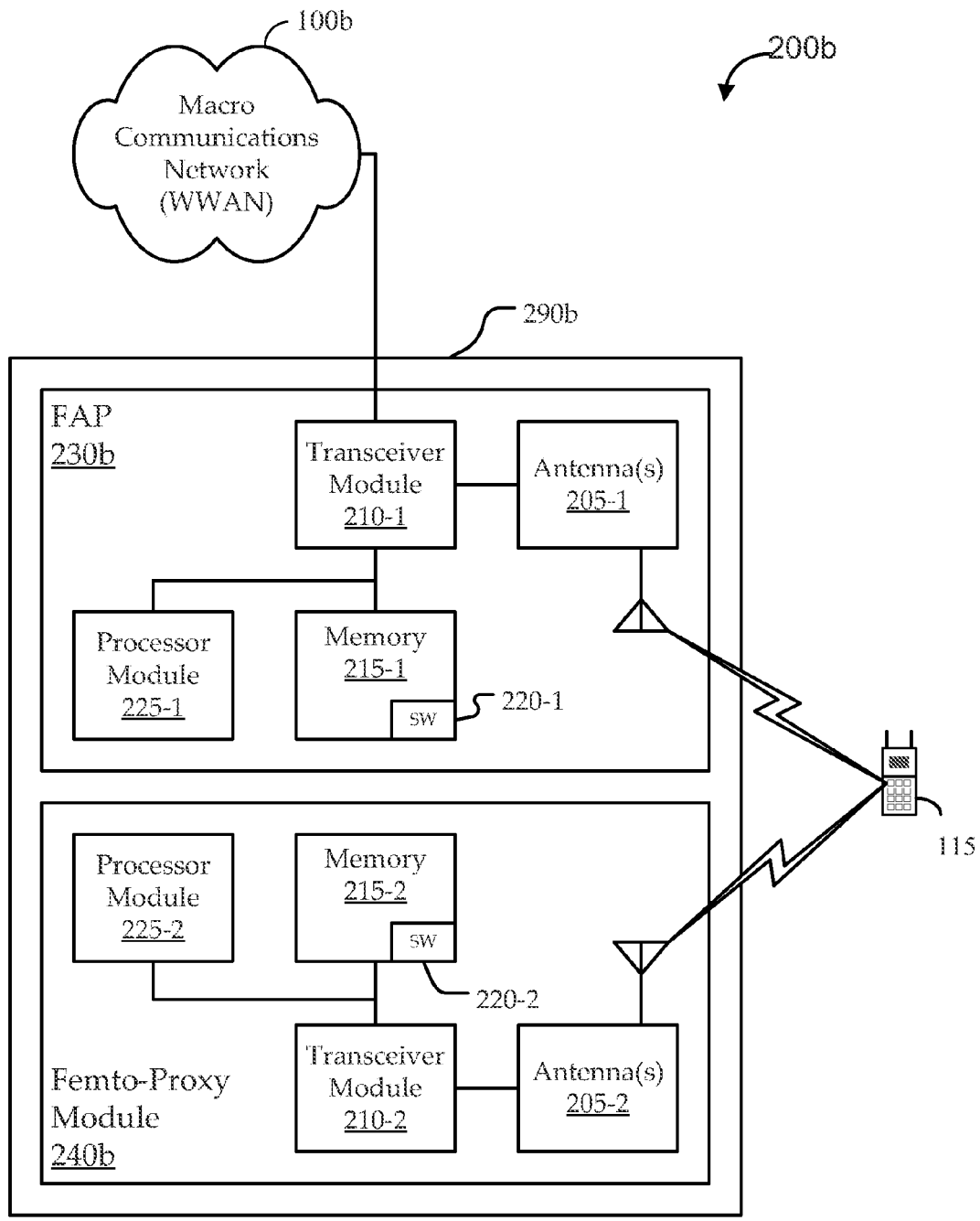
FIG. 2B shows a block diagram of an exemplary wireless communications system that includes an architecture of a femto-proxy system that is different from the architecture shown in FIG. 2A.

FIG. 2B shows a block diagram of a wireless communications system 200b that includes an architecture of a femto-proxy system 290b that is different from the architecture shown in FIG. 2A. Similar to the femto-proxy system 290a, the femto-proxy system 290b includes a femto-proxy module 240b and a FAP 230b. Unlike the system 290a, however, each of the femto-proxy module 240b and the FAP 230b has its own antenna 205, transceiver module 210, memory 215, and processor module 225. Both transceiver modules 210 are configured to communicate bi-directionally, via their respective antennas 205, with ATs 115. The transceiver module 210-1 of the FAP 230b is illustrated in bi-directional communication with the macro communications network 100b (e.g., typically over a backhaul network).

For the sake of illustration, the femto-proxy system 290b is shown without a separate communications management subsystem 250. In some configurations, a communications management subsystem 250 is provided in both the femto-proxy module 240b and the FAP 230b. In other configurations, the communications management subsystem 250 is implemented as part of the femto-proxy module 240b. In still other configurations, functionality of the communications management subsystem 250 is implemented as a computer program product (e.g., stored as software 220-1 in memory 215-1) of one or both of the femto-proxy module 240b and the FAP 230b.

Figure 3:
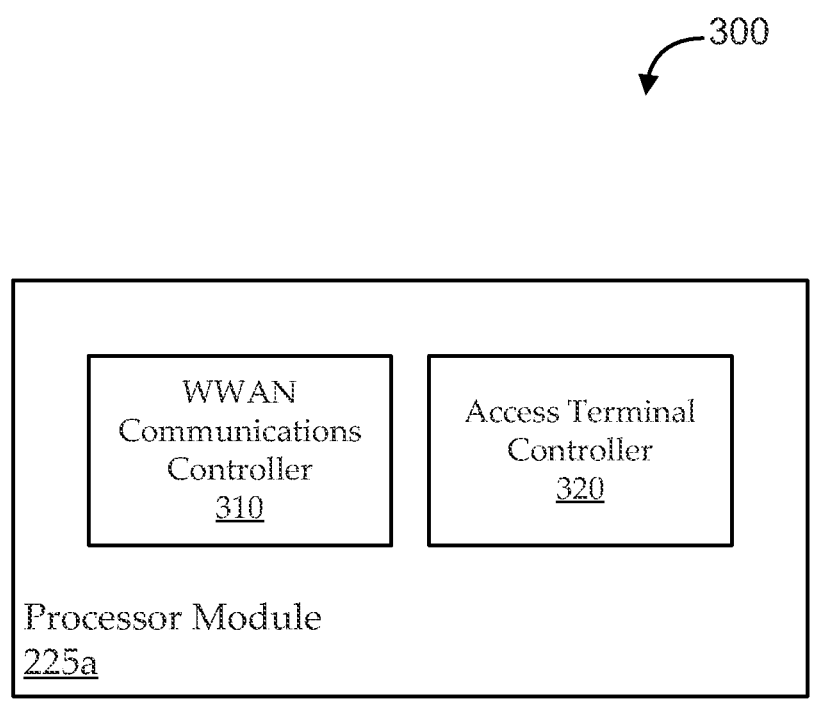
FIG. 3 shows a block diagram of an example of a processor module for implementing functionality of a communications management subsystem shown in FIG. 2A.

In yet other configurations, some or all of the functionality of the communications management subsystem 250 is implemented as a component of the processor module 225. FIG. 3 shows a block diagram 300 of a processor module 225a for implementing functionality of the communications management subsystem 250. The processor module 225a includes a WWAN communications controller 310 and an access terminal controller 320. The processor module 225a is in communication (e.g., as illustrated in FIGS. 2A and 2B) with the FAP 230 and the femto-proxy module 240. The WWAN communications controller 310 is configured to receive a WWAN communication (e.g., a page) for a designated AT 115. The access terminal controller 320 determines how to handle the communication, including affecting operation of the FAP 230 and/or the femto-proxy module 240.

Both the FAP 230a of FIG. 2A and the FAP 230b of FIG. 2B are illustrated as providing a communications link only to the macro communications network 100a. However, the FAP 230 may provide communications functionality via many different types of networks and/or topologies. For example, the FAP 230 may provide a wireless interface for a cellular telephone network, a cellular data network, a local area network (LAN), a metropolitan area network (MAN), a wide area network (WAN), the public switched telephone network (PSTN), the Internet, etc.

Figure 4A:
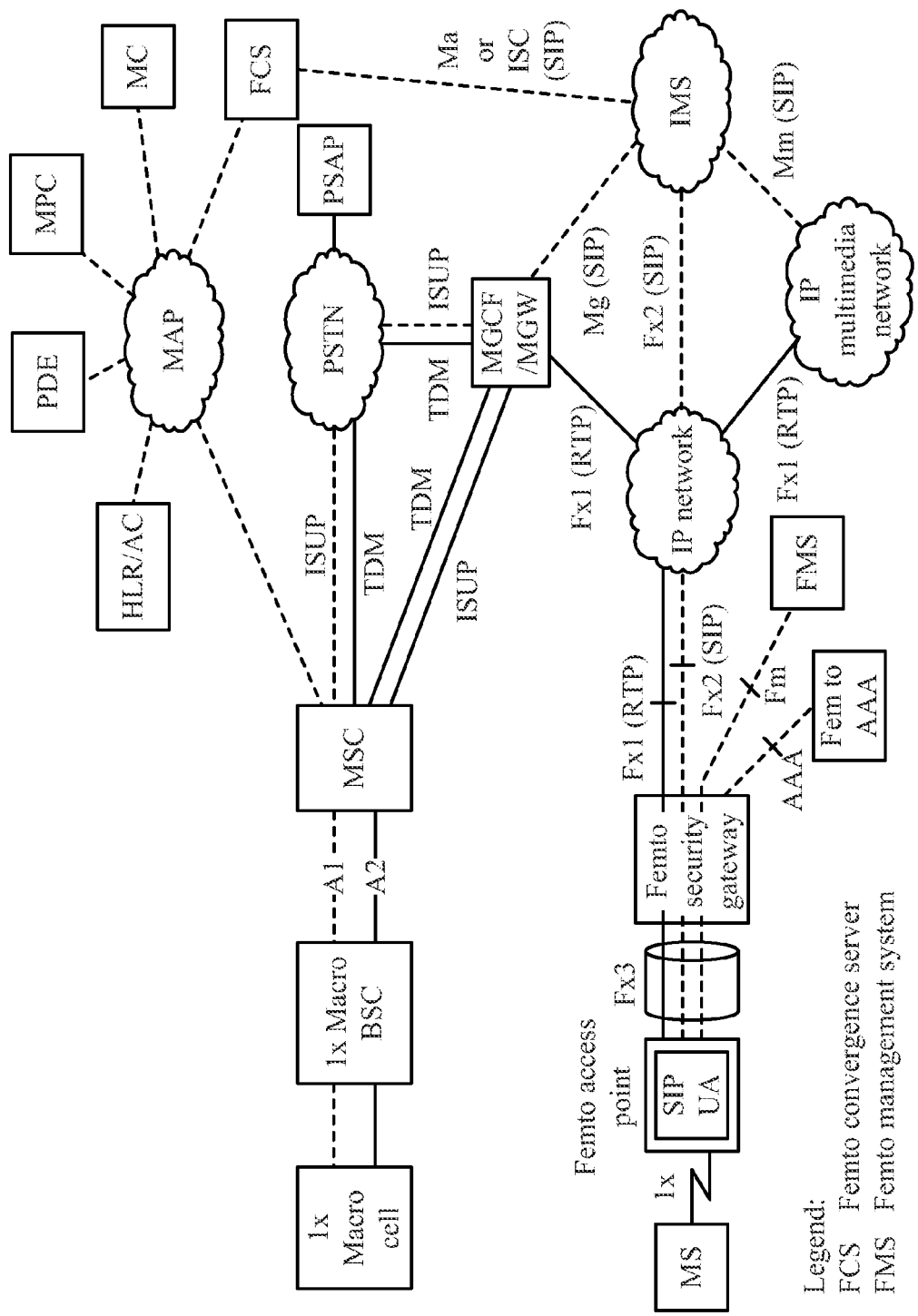
FIG. 4A shows detail regarding an example of a femtocell architecture for legacy circuit services, for example, for CDMA 1X networks.
Figure 4B:
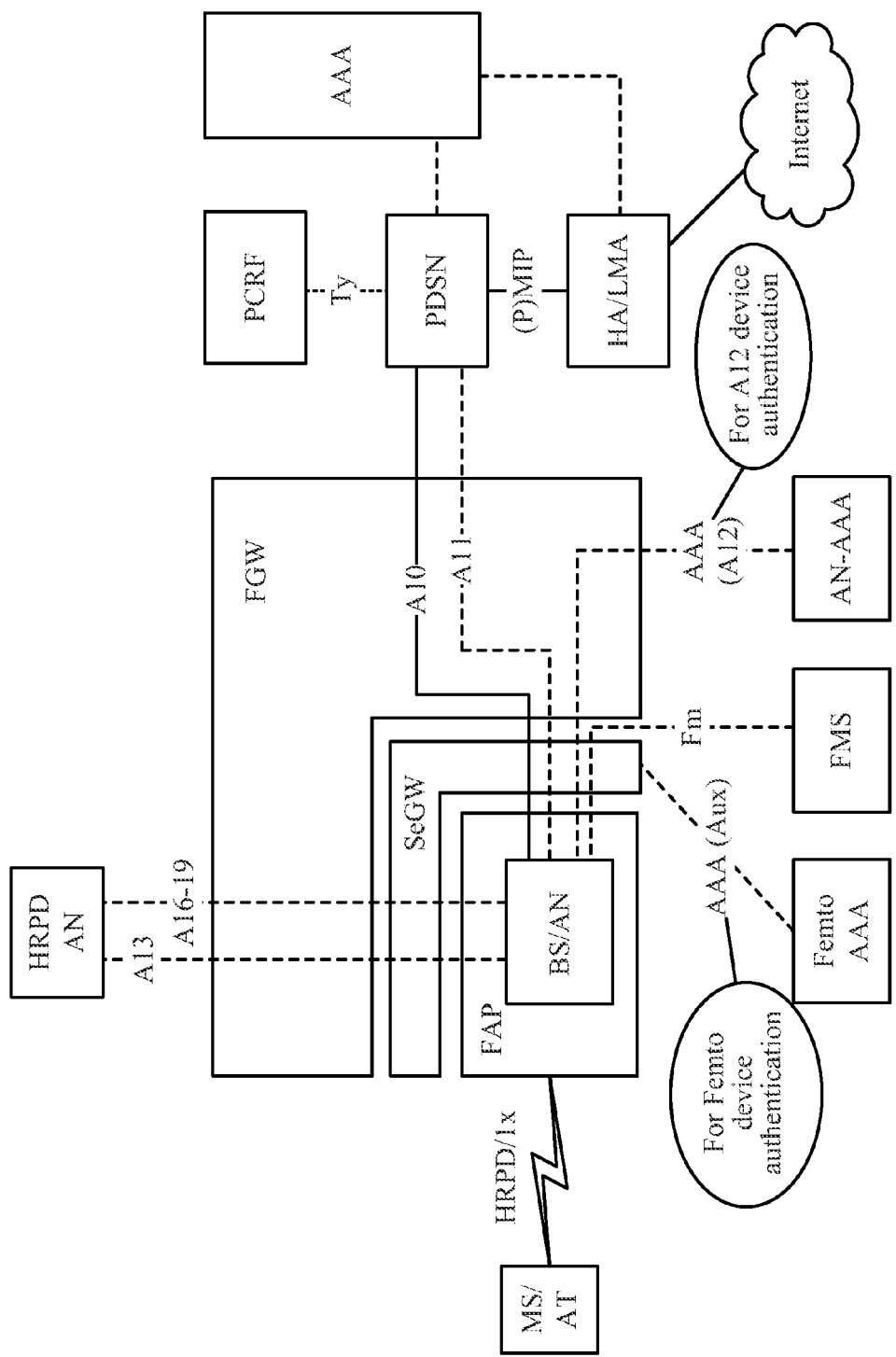
FIG. 4B shows detail regarding an example of a femtocell architecture for packet data service access using legacy interfaces, for example, for HRPD networks.

FIGS. 4A and 4B show further detail with respect to femtocell architecture in communication networks for providing various services. Specifically, FIG. 4A shows detail regarding an exemplary femtocell architecture for legacy circuit services. For example, the network of FIG. 4A may be a CDMA 1X circuit switched services network. FIG. 4B shows detail regarding an exemplary femtocell architecture for packet data service access using legacy interfaces. For example, the network of FIG. 4B may be a 1xEV-DO (HRPD) packet data services network. These architectures illustrate possible portions of the communications systems and networks shown in FIGS. 1-3.

Figure 5:
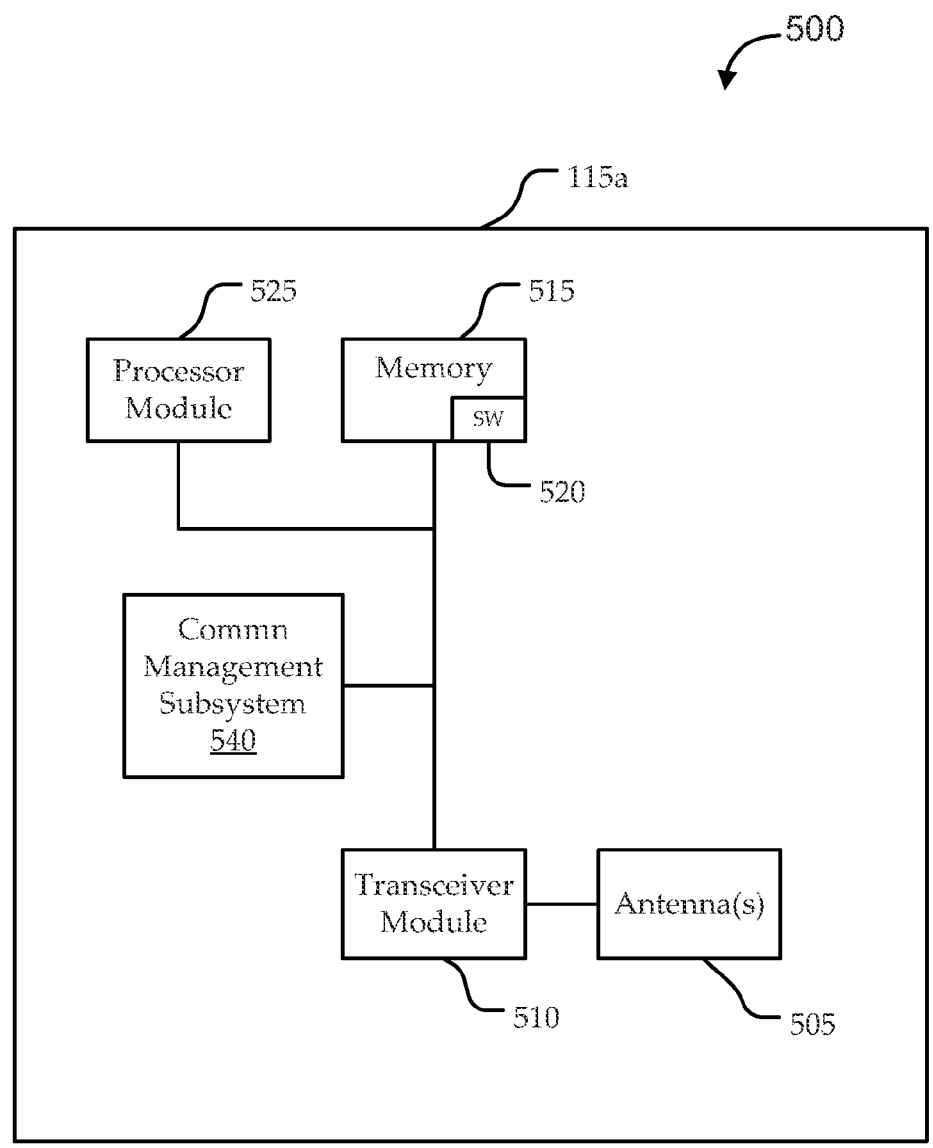
FIG. 5 shows a block diagram of an example of a mobile access terminal for use with the femto-proxy systems of FIGS. 2A and 2B in the context of the communications systems and networks of FIGS. 1-4B.

As described above, the femto-proxy systems 290 are configured to communicate with client devices, including the ATs 115. FIG. 5 shows a block diagram 500 of a mobile access terminal (AT) 115a for use with the femto-proxy systems 290 of FIGS. 2A and 2B in the context of the communications systems and networks of FIGS. 1-4B. The AT 115a may have any of various configurations, such as personal computers (e.g., laptop computers, netbook computers, tablet computers, etc.), cellular telephones, PDAs, digital video recorders (DVRs), internet appliances, gaming consoles, e-readers, etc. For the purpose of clarity, the AT 115a is assumed to be provided in a mobile configuration, having an internal power supply (not shown), such as a small battery, to facilitate mobile operation.

The AT 115a includes antennas 505, a transceiver module 510, memory 515, and a processor module 525, which each may be in communication, directly or indirectly, with each other (e.g., via one or more buses). The transceiver module 510 is configured to communicate bi-directionally, via the antennas 505 and/or one or more wired or wireless links, with one or more networks, as described above. For example, the transceiver module 510 is configured to communicate bi-directionally with BTSs 105 of the macro communications network (e.g., the communications system 100 of FIG. 1), and, in particular, with at least one FAP 230.

As described above, the transceiver module 510 may be configured to further communicate over one or more OOB links. For example, the transceiver module 510 communicates with a femto-proxy system 290 (e.g., as described with reference to FIGS. 2A and 2B) over both an in-band (e.g., macro) link to the FAP 230 and at least one OOB link to the femto-proxy module 240. The transceiver module 510 may include a modem configured to modulate the packets and provide the modulated packets to the antennas 505 for transmission, and to demodulate packets received from the antennas 505. While the AT 115a may include a single antenna 505, the AT 115a will typically include multiple antennas 505 for multiple links.

The memory 515 may include random access memory (RAM) and read-only memory (ROM). The memory 515 may store computer-readable, computer-executable software code 520 containing instructions that are configured to, when executed, cause the processor module 525 to perform various functions described herein (e.g., call processing, database management, message routing, etc.). Alternatively, the software 520 may not be directly executable by the processor module 525 but be configured to cause the computer, e.g., when compiled and executed, to perform functions described herein.

The processor module 525 may include an intelligent hardware device, e.g., a central processing unit (CPU) such as those made by Intel® Corporation or AMD®, a microcontroller, an application specific integrated circuit (ASIC), etc. The processor module 525 may include a speech encoder (not shown) configured to receive audio via a microphone, convert the audio into packets (e.g., 30 ms in length) representative of the received audio, provide the audio packets to the transceiver module 510, and provide indications of whether a user is speaking. Alternatively, an encoder may only provide packets to the transceiver module 510, with the provision or withholding/suppression of the packet itself providing the indication of whether a user is speaking.

According to the architecture of FIG. 5, the AT 115a further includes a communications management subsystem 540. The communications management subsystem 540 may manage communications with the macro (e.g., WWAN) network, one or more OOB networks (e.g., piconets, femto-proxy modules 240, etc.), one or more femtocells (e.g., FAPs 230), other ATs 115 (e.g., acting as a master of a secondary piconet), etc. For example, the communications management subsystem 540 may be a component of the AT 115a in communication with some or all of the other components of the AT 115a via a bus. Alternatively, functionality of the communications management subsystem 540 is implemented as a component of the transceiver module 510, as a computer program product, and/or as one or more controller elements of the processor module 525.

The AT 115a includes communications functionality for interfacing with both the macro (e.g., cellular) network and one or more OOB networks (e.g., the femto-proxy module 240 link). For example, some ATs 115 include native cellular interfaces as part of the transceiver module 510 or the communications management subsystem 540 (e.g., a transceiver utilizing cellular network communication techniques that consume relatively large amounts of power in operation) for communicating with other appropriately configured devices (e.g., for establishing a link with a macro communication network via FAP 230) through a native cellular wireless link. The native cellular interfaces may operate according to one or more communication standards, including, but not limited to, W-CDMA, CDMA2000, GSM, WiMax, and WLAN.

Furthermore, the ATs 115 may also include OOB interfaces implemented as part of the transceiver module 510 and/or the communications management subsystem 540 (e.g., a transceiver that may consume relatively low amounts of power in operation and/or may cause less interference than in the in-band spectrum) for communicating with other appropriately configured devices over a wireless link. One example of a suitable OOB communication interface is a Bluetooth-compliant transceiver that uses a time-division duplex (TDD) scheme.

Active-Hand-In Embodiments

In many cases, it is desirable to support active hand-in from a macrocell (e.g., macro BTS 105 of FIG. 1) to the FAP 230 and/or active hand-out from the FAP 230 to the macro BTS 105 using handoffs to provide seamless voice and data service to active users (active ATs 115). Active hand-outs are relatively simple to implement and are supported by most operators with legacy macro networks 100 and ATs 115. However, active hand-in is challenging and is not typically supported by operators.

For example, as an AT 115 moves during the course of active communications with the macro network 100 (e.g., during a voice call, an active data transfer, etc.), a determination may be made that a handoff is needed (e.g., the current macro BTS 105 signal may become weak). The need for a handoff may be determined according to measurement reports sent by the active AT 115. Notably, the phrase "measurement report" may be generally associated with 3GPP networks, but is intended herein to include any similar types of measurement reporting in any similar type of network (e.g., including "PSMMs," or pilot strength measurements, in 3GPP2 networks).

The measurement reports include a measurement of the strength of the pilot observed by the AT 115 and the forward link cell identifier of the target cell. The cell identifier may be any identifier used by the macro network 100 to identify a particular cell. For example, the cell identifier may be a "PN offset" in a 3GPP2 network, a "PSC" (primary scrambling code) in a 3GPP network, etc. On a typical macro network 100, enough cell identifiers (e.g., PN offsets) are available to substantially ensure that, given the geographical distribution of macro BTSs 105, each macro BTS 105 can effectively be uniquely identified by its cell identifier (e.g., by a base station controller (BSC) 120 in the macro network 100, a Mobile Switching Center (MSC) in the core of the network, etc.).

While macro BTSs 105 may effectively be uniquely identified by the macro network 100, there are typically not enough remaining cell identifiers to uniquely identify all FAPs 230 added to the network. For example, a typical macro network 100 may have 512 PN offset values available for assignment to all the cells in its network. PN offsets may be reused on different carriers, in different geographic regions, etc. to extend the number of cells that can effectively be identified without confusion. However, only a small portion of the PN offset values may be available for use by FAPs 230 (i.e., other than the values reserved for use by macro BTSs 105), and the number and density of FAPS may be relatively large in some areas. For example, only a small number of PN offset values must be reused among possibly hundreds of FAPs 230 per macro sector.

When a handoff is required for an active AT 115 to a macro BTS 105 (as a handoff from another macro BTS 105 or as a hand-out from a FAP 230), the cell identifier provided in the measurement report may be sufficient to reliably determine the appropriate macro BTS 105 for handoff. The active communication may be handed off to the correct target cell without ambiguity. However, when a handoff is required for an active AT 115 to a FAP 230 (as a hand-in from a macro BTS 105), the same cell identifier provided in the measurement report may be shared by multiple FAPs 230 in the same macro sector. As such, the cell identifier alone may be insufficient to reliably determine the appropriate FAP 230 for hand-in in all cases. For example, the AT 115 may be near its home FAP 230, and it may be desirable to hand-in to that home FAP 230, but another FAP 230 in the macro sector may be associated with the same cell identifier.

In some newer networks, additional identifiers are available that may mitigate or solve this issue. For example, in CDMA2000 1X Revision E networks, a FAP 230 can transmit on the paging channel the Access Point Identification message (APIDM) that contains unique identifiers, location information, and/or other information that may make identification of a particular FAP 230 based only on its cell identifier(s) more unique and reliable. Upgraded ATs 115 can exploit new cell identifier(s), for example, by decoding the APIDM messages of neighboring cells and reporting the identifiers in measurement reports during active communications. The controllers (e.g., macro BSC 120 and MSC) can then include the APIDM in the handoff messages to uniquely identify the target FAP 230 (e.g., to the FCS). It is important to note that this technique is only available for communications between upgraded networks and upgraded ATs 115. For operators who do not want to upgrade the air interface, this technique is not available.

Operators of legacy networks (including those desiring to communicate with legacy ATs 115) may address this difficulty with active hand-in in different ways. Some typical networks do not support active hand-in at all. In the event that the hand-in would be the only way to maintain the active communications with the AT 115, the active communications may simply be lost (e.g., a call may be dropped when signals from macro BTSs 105 are lost, even when the AT 115 is otherwise in the FAP coverage area).

According to one technique for addressing the difficulty with active hand-in in legacy networks, some operators implement blind handoff. For example, when the measurement report includes a cell identifier that is shared by multiple FAPs 230 in the same macro sector, the network may blindly select any of the FAPs 230 having that cell identifier for the hand-in. If blind selection results in hand-in to an appropriate FAP 230, the hand-in may be successful. However, if blind selection results in hand-in to an inappropriate FAP 230 (e.g., one that is out of range of the AT 115, one for which the AT 115 is not authorized to attach, etc.), the active communications may be lost.

According to another technique, operators use reverse-link sensing to improve the type of blind hand-in discussed above. The reverse-link sensing may result in an educated guess or even an accurate determination as to the selection among FAPs 230 sharing the cell identifier identified for the hand-in. For example, as discussed above, the AT 115 in active communication with the macro network 100 sends a measurement report (e.g., MR, PSMM, etc.) to the source macro BTS 105 (the macro BTS 105 via which the AT 115 is currently communicating), and the measurement report includes the cell identifier (e.g., PN offset, PSC, etc.) of a target FAP 230 as the strongest neighboring cell. Based on the measurement report, the source macro BTS 105 determines to perform a hard hand-off. The source macro BTS 105 sends a Handoff Required message to its source MSC (e.g., via its source BSC 120), and the source MSC sends a FACDIR2 message to a target femto convergence system (FCS) via core network messaging. As used herein, the FCS is intended to include any type of interface gateway for providing an interface between the FAPs 230 and the core network. Typically, the FCS is implemented as a femto convergence server. The core network messaging may direct the target FCS to initiate the handoff.

Assuming that the target FCS cannot reliably determine the appropriate target FAP 230 (i.e., multiple FAPs 230 share the cell identifier of the measurement report), the target FCS sends a measurement request message to all FAPs 230 sharing the cell identifier. The measurement request may include the public long code mask (e.g., scrambling code, IMSI, etc.) of the AT 115. Typically, the measurement request is sent simultaneously to all potential target FAPs 230 to avoid waiting for serialized responses. Upon receiving this message, the FAPs 230 attempt to detect the AT 115 by its long code mask and measure the signal strength of the reverse link of the AT 115. Each FAP 230 responds to the target FCS providing at least the signal strength measured on the reverse link of the AT 115. In some cases, the FAPs 230 further determine whether the ATs 115 (e.g., their respective IMSIs) are authorized to access services via the FAP 230, and notify the FCS, accordingly. Further, some FAPs 230 may not send a measurement response. For example, certain network configurations allow FAPs 230 to omit responding with a measurement response message when detection of the AT 115 is not successful, when the measurement result is below an operator's configurable threshold, etc. Based on the measurement response results, the target FCS attempts to uniquely determine the appropriate target FAP 230, and continues with the active hand-in process.

It is worth noting certain aspects of this reverse link measurement technique. One aspect is that, upon sending the Measurement Request message to the candidate target FAPs 230, the target FCS may typically start an instance of a timer to await the arrival of the corresponding Measurement Response messages from the FAPs 230. The duration that the FCS waits for responses from the FAPs 230 should be large enough to account for round-trip delays between the FCS and any of the candidate target FAPs 230 plus the value of a Measurement Response Timer field included in the Measurement Response Options for certain network components. This may impose an undesirable delay on the hand-in, which, in a worst-case, may cause the hand-in process to fail.

Another aspect of the reverse link measurement technique is that each FAP 230 may need an extra radio receiver to detect the presence of nearby active ATs 115 communicating with the macro network 100 by measuring reverse links of the ATs 115. It may be undesirable (e.g., it may increase the cost and complexity of the FAP 230 design and implementation) to include the extra radio receiver to enable reverse link sensing. Yet another aspect of the reverse link measurement technique is that reverse link measurement of ATs 115 by the FAPs 230 is not completely reliable. For example, when an AT 115 is at a cell edge, it may have higher transmit power, such that more than one FAP 230 may simultaneously detect the AT 115. Similarly, when an AT 115 is transmitting at a power that is too low, no FAPs 230 may detect the AT 115.

It will now be appreciated that operators of legacy systems may be unable to reliably support active hand-ins to FAPs 230 using existing techniques. Embodiments include novel techniques for supporting active hand-ins for legacy networks.

Figure 6:
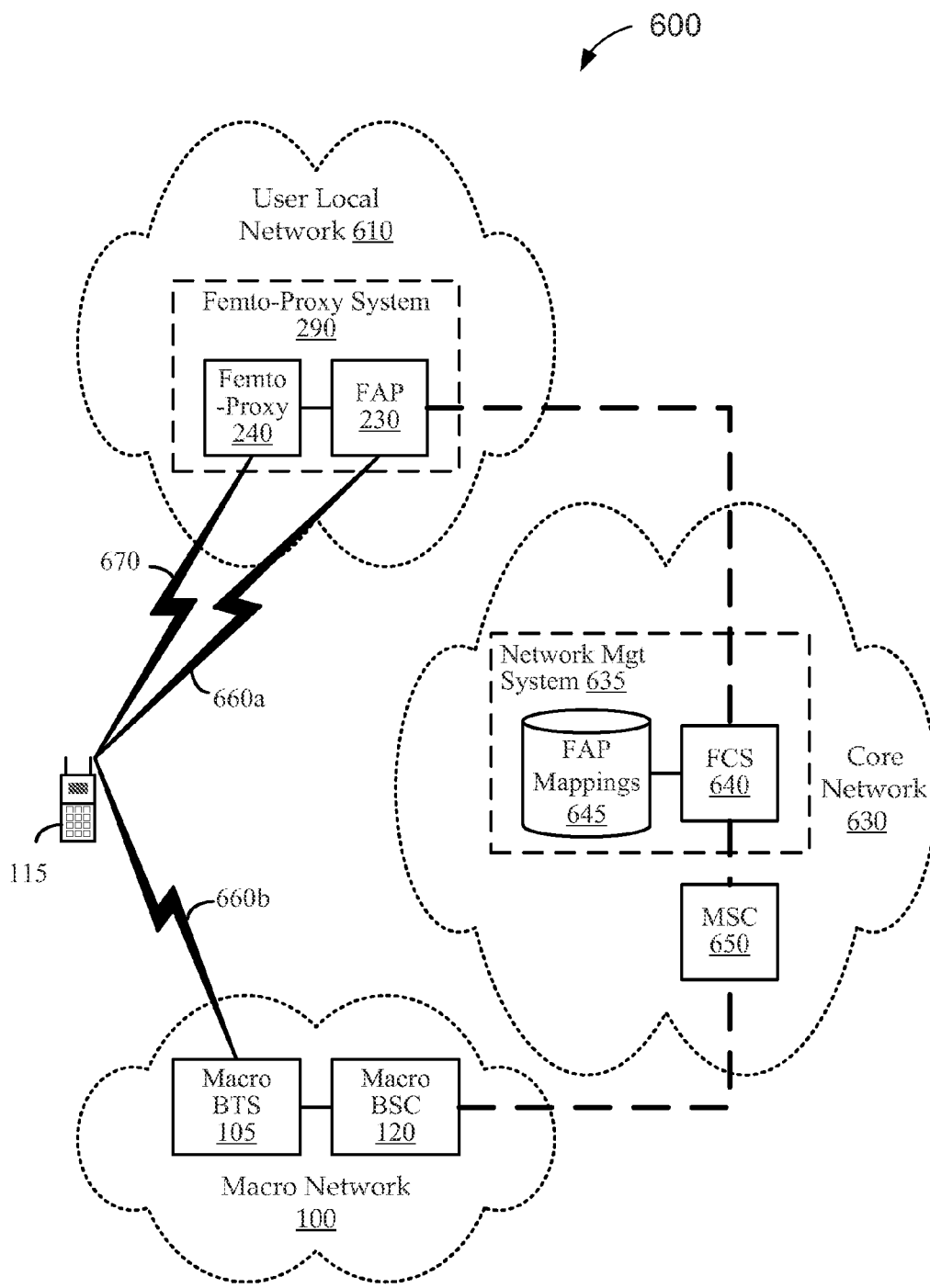
FIG. 6 shows a simplified network diagram of a communications system for facilitating active hand-in using a femto-proxy system having a femtocell integrated with a femto-proxy module.

Turning to FIG. 6, a simplified network diagram is shown of a communications system 600 for facilitating active hand-in.

The communications system 600 includes a macro network 100, a user local network 610, and a core network 630. The core network 630 includes, among other things, a femto convergence system (FCS) 640 and a mobile switching center (MSC) 650. The FCS 640 is in communication with a number of FAPs 230 (only one FAP 230 is shown for clarity), and the MSC 650 is in communication with multiple macro BTSs 105 via one or more macro BSCs 120 (only one macro BTS 105 is show for clarity). The FAP 230 is in communication with the macro network 100 via core network 630 elements, such that cellular communications may be facilitated through the FAP 230 using functionality of the FCS 640 and MSC 650.

Embodiments are described herein as providing certain functionality using a network management system 635 in the core network 630. The network management system 635 may include the FCS 640 and a data storage device or system for storing FAP mappings 645, as described more fully below. Some configurations of the FAP mappings 645 are stored as part of the FCS 640, while others are stored in a separate data storage device or system in communication with the FCS 640. According to some other configurations, the FAP mappings 645 can be stored in other locations, for example, as part of the MSC 650, which may or may not be considered as part of the network management system 635.

An AT 115 in active communications with the macro BTS 105 (over a macro communications link 660) may approach a coverage area of the FAP 230. The macro network 100 (e.g., the macro BSC 120) determines that a handoff is needed based on a measurement report from the AT 115. Conventionally, the measurement report identifies the target FAP 230 by its cell identifier (e.g., its PN offset). As described above, however, the cell identifier alone may be insufficient to uniquely identify the target FAP 230 (i.e., in the context of other FAPs 230 in the same macro sector that may be associated with the same cell identifier).

Active hand-in functionality described herein involves use of a femto-proxy system 290 having a FAP 230 integrated with an OOB femto-proxy 240. The AT 115 is configured to include in the measurement report both the cell identifier of the FAP 230 and an OOB identifier of the femto-proxy module 240 associated with the FAP 230. As shown, the user local network 610 includes the FAP 230 functionality integrated with OOB functionality of a femto-proxy module 240 as part of a femto-proxy system 290. This OOB functionality is facilitated over an OOB communications link 670 that can be established between the AT 115 and the femto-proxy module 240.

It is worth noting that the femto-proxy module 240 and the FAP 230 can be integrated in different ways according to different configurations and embodiments. In some exemplary configurations, the femto-proxy module 240 includes an OOB device (e.g., an OOB radio) that is physically integrated with the FAP 230 into a single housing or assembly (e.g., and in communication over a bus or some other internal connection). In other exemplary configurations, the OOB femto-proxy 240 is separately housed and may be in communication with the FAP 230 using a wired or wireless connection. In such configurations, the OOB femto-proxy 240 may typically be located close enough to the FAP 230 so that proximity detection by the OOB femto-proxy 240 indicates proximity also to the FAP 230. In still other exemplary configurations, the OOB femto-proxy 240 is logically integrated with the FAP 230 (e.g., the components can otherwise be logically associated with each other by the core network 630). For example, the OOB femto-proxy 240 and the FAP 230 are part of a common subnet so that proximity detection by the OOB femto-proxy 240 can be associated with proximity to the FAP 230.

When the AT 115 approaches the coverage area of the FAP 230, it may detect the associated femto-proxy module 240 over the OOB communications link 670. The AT 115 sends a measurement report that includes the cell identifier of the FAP 230, the OOB identifier of the femto-proxy module 240, and the link measurement (e.g., a signal strength of a WWAN communications link 660a between the AT 115 and the FAP 230). If it is determined that a handoff is needed based on the measurement report, the core network 630 can now use the OOB identifier to help uniquely determine the appropriate target FAP 230 from among multiple candidate target FAPs 230.

For example, a handoff request is sent by the MSC 650 to the target FCS 640 for identifying an appropriate FAP 230 for the hand-in. The FCS 640 uses the FAP mappings 645 to uniquely map the OOB identifier to a particular FAP 230 having the cell identifier indicated in the measurement report. The handoff request is then forwarded to the appropriate target FAP 230, and the hand-in proceeds as described below.

While many different types of out-of-band communications may be used to facilitate functionality described here (e.g., as discussed above), the discussion below focuses on Bluetooth as facilitating the OOB communications of these embodiments. Bluetooth provides certain features. One feature is that Bluetooth radios are integrated into many ATs 115, so that the Bluetooth functionality can be exploited for many users without modifying their existing ATs 115. Another feature is that the tolerable path loss between two "Class 1.5" Bluetooth devices may be comparable or even higher than between a FAP 230 and an AT 115. In any given environment, this higher tolerable path loss can translate to higher effective range (e.g., facilitating FAP 230 discovery, handover, and/or interference mitigation, as described herein).

Yet another feature of Bluetooth is that the Bluetooth address (BD_ADDR) is a unique, 48-bit address used to identify each Bluetooth enabled device. The Bluetooth address is used when a device communicates with another device, and is divided into a 24-bit LAP (Lower Address Part), a 16-bit NAP (Non-significant Address Part), and an 8-bit UAP (Upper Address Part). The LAP is assigned by a manufacturer and is unique for each Bluetooth device, while UAP and NAP are part of an Organizationally Unique Identifier (OUI). Using the Bluetooth address, each Bluetooth adapter in any device can be identified according to a globally unique value.

Each of the AT 115 and the FAP 230 has a unique Bluetooth device address (BD_ADDR) that is used for paging the other device (e.g., AT 115 pages the FAP 230 or the FAP 230 pages the AT 115). It is understood that the BD_ADDR of the other device is known by the paging device. For detection of the FAP 230 with the OOB link, either the FAP 230 can page the ATs 115 or the ATs 115 can page the FAP 230. When the paged device responds to the page message, the paging device knows that the paged device is in proximity and the paged device also knows that the paging device is in proximity. Notably, the same or similar techniques may be used for other types of out-of-band addressing. For example, the devices may know each other's WiFi MAC address (e.g., as well as the SSID of the WiFi network for detection), etc. The AT 115 may then assist the macro network 100 in effecting the active hand-in.

Figure 7A:
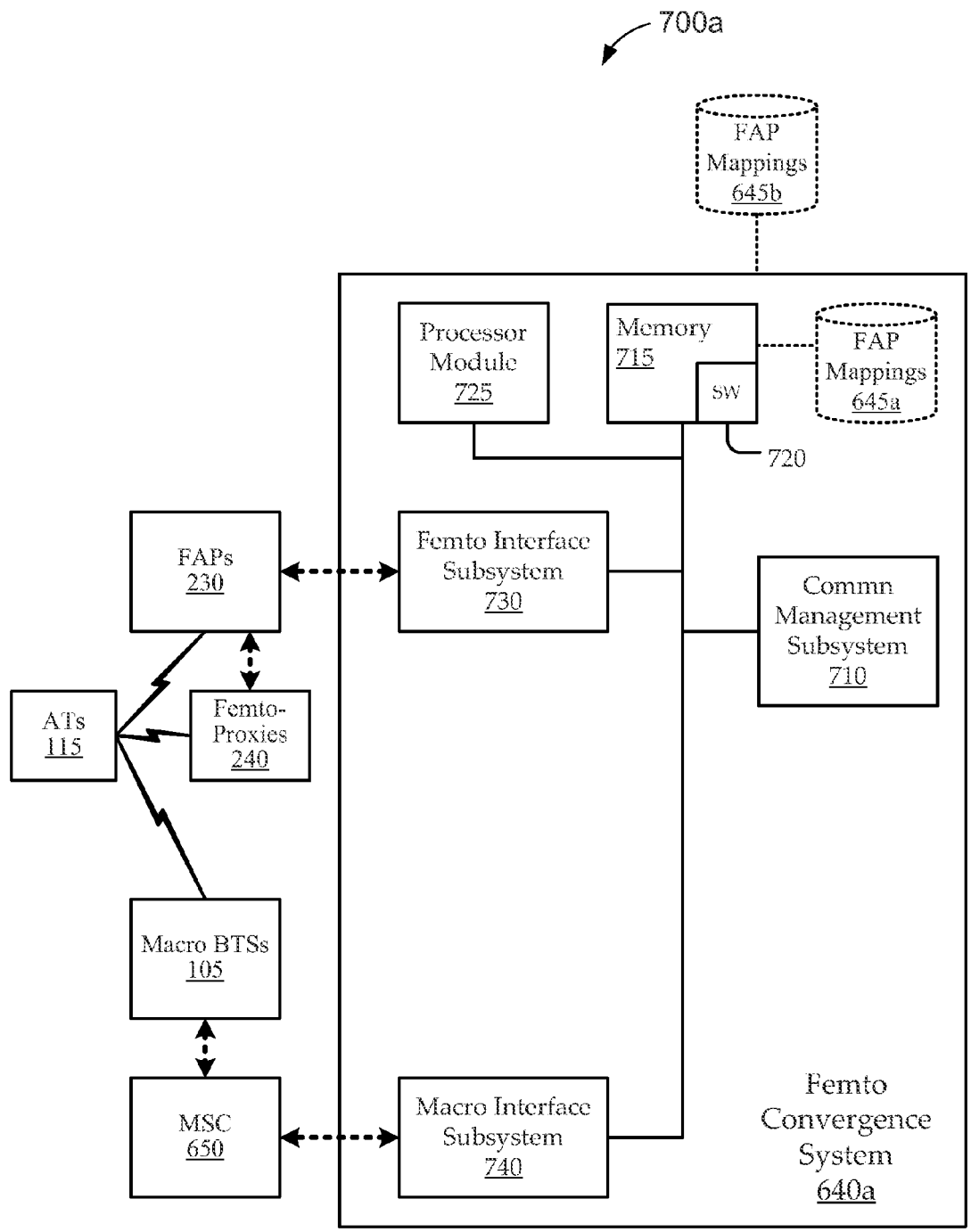
FIG. 7A shows a block diagram of a wireless communications system that includes a femto convergence system (FCS)
Figure 7B:
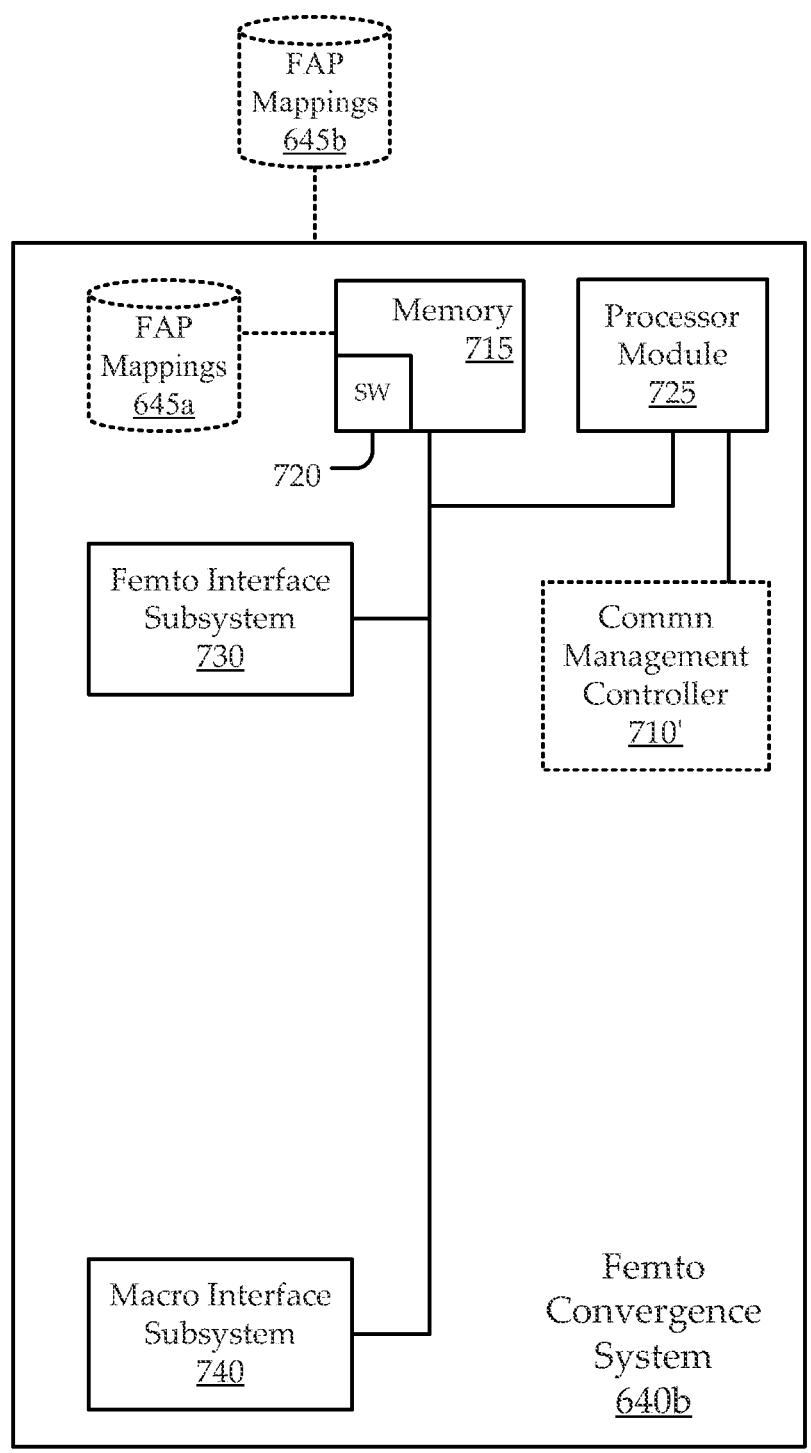
FIG. 7B shows a block diagram of an FCS that is an alternate configuration of the FCS of FIG. 7A.

To facilitate AT 115 assisted hand-in, the core network 630 may include configurations of FCSs 640, such as those described in FIGS. 7A and 7B. FIG. 7A shows a block diagram of a wireless communications system 700a that includes a femto convergence system (FCS) 640a. The FCS 640a includes a communications management subsystem 710, a femto interface subsystem 730, and a macro interface subsystem 740. The FCS 640a also includes memory 715 and a processor module 725. All the components of the FCS 640a may be in communication with each other directly or indirectly (e.g., over one or more buses).

For the sake of context and clarity, the femto interface subsystem 730 is shown in communication with FAPs 230, and the macro interface subsystem 740 is shown in communication with macro BTSs 105 (via an MSC 650 and/or one or more macro BSCs (not shown)). Various communications functions, including those involved in facilitating hand-in, are implemented and/or managed using the communications management subsystem 710. For example, the communications management subsystem 710 may at least partially handle communications with macro network elements using functionality of the macro interface subsystem 740 and may at least partially handle communications with FAPs 230 using functionality of the femto interface subsystem 730. For example, the communications management subsystem 710 may be a component of the FCS 640a in communication with some or all of the other components of the FCS 640a via a bus.

The memory 715 may include random access memory (RAM) and read-only memory (ROM). In some embodiments, the memory 715 is configured to maintain registration-related information. In particular, as illustrated, the memory 715 may be configured to store FAP mappings 645a. The FAP mappings 645a can be used to map the OOB identifier (e.g., Bluetooth device address, WiFi MAC address, etc.) of an OOB femto-proxy module 240 with the cell identifier of an associated FAP 230. The FAP mappings 645a may further map one or both of the OOB identifier or the cell identifier with another unique identifier (e.g., an IP address, etc.) usable by the FCS 640a to address the FAP 230 over a backhaul network.

As illustrated, alternatively, a data storage location external to the FCS 640a may be used to store FAP mappings 645b. For example, a server or other data storage device or system is in communication with the FCS 640a. The external FAP mappings 645b may be accessible to the FCS 640a over a local or remote network or in any other useful way.

The memory 715 may also store computer-readable, computer-executable software code 720 containing instructions that are configured to, when executed, cause the processor module 725 to perform various functions described herein (e.g., call processing, database management, message routing, etc.). Alternatively, the software 720 may not be directly executable by the processor module 725 but be configured to cause the computer, e.g., when compiled and executed, to perform functions described herein.

The processor module 725 may include an intelligent hardware device, e.g., a central processing unit (CPU) such as those made by Intel® Corporation or AMD®, a microcontroller, an application specific integrated circuit (ASIC), etc. Embodiments of the processor module 725 may be configured to facilitate functionality, such as timer functionality. Further, embodiments of the processor module 725 may include or facilitate some or all of the functionality of the communications management subsystem 710, the femto interface subsystem 730, or the macro interface subsystem 740.

For example, FIG. 7B shows a block diagram of an FCS 640b that is an alternate configuration of the FCS 640a of FIG. 7A. As with the FCS 640a of FIG. 7A, the FCS 640b of FIG. 7B includes a femto interface subsystem 730, a macro interface subsystem 740, memory 715, and a processor module 725, all in communication with each other directly or indirectly (e.g., over one or more buses). Further, configurations of the FCS 640b include or are in communication with FAP mappings 645 for facilitating reliable hand-in.

Unlike the FCS 640a of FIG. 7A, the FCS 640b of FIG. 7B includes communications management controller 710'. Embodiments of the communications management controller 710' are implemented as part of the processor module 725 to provide substantially the same functionality as that of the communications management subsystem 710 shown in FIG. 7A.

As discussed above, embodiments of FCSs 640, such as those described in FIGS. 7A and 7B, can interact with FAPs 230 to facilitate reliable hand-in. For example, when an AT 115 approaches a FAP 230, the AT 115 detects the femto-proxy module 240 associated with the FAP 230 in its proximity using an OOB link (e.g., by a Bluetooth paging procedure). In addition to or as part of the OOB detection procedure, the FAP 230 may determine whether the AT 115 is an authorized user. For example, the FAP 230 may check an access control list to determine whether the AT 115 is authorized to access macro or WWAN communications services via the FAP 230.

In some embodiments, the OOB radio range (e.g., the edge of Bluetooth coverage) is greater than the FAP 230 coverage range, such that OOB detection may be performed before the AT 115 detects the FAP 230. The AT 115 can detect the OOB identifier of the associated femto-proxy module 240 prior to sending a measurement report with only the cell identifier of the FAP 230. Accordingly, the AT 115 can be configured to send the OOB identifier as part of the measurement report when the OOB identifier is detected before or substantially concurrently with detecting the cell identifier of the FAP 230.

It will be appreciated that the AT 115 assisted hand-in techniques described herein provide certain features. One feature is that the techniques may be used to reliably determine an appropriate target FAP 230 for active hand-in. Another feature is that no changes may be needed in the air interface or the legacy infrastructure. The techniques may be implemented with changes only to the AT 115, the FAP 230, and the FCS 640. Further, while reverse-link sensing could be used in certain circumstances, the techniques described above allow for reliable identification of an appropriate target femtocell without reverse-link sensing, which may give rise to some additional features. For example, core network signaling (e.g., from measurement request and response between the FCS 640 and the FAPs 230) may be reduced; the FAP 230 may be implemented without the extra radio that would otherwise be needed for reverse-link sensing; there may be a reduction in handoff delays caused by waiting for measurement responses; etc.

Figure 8:
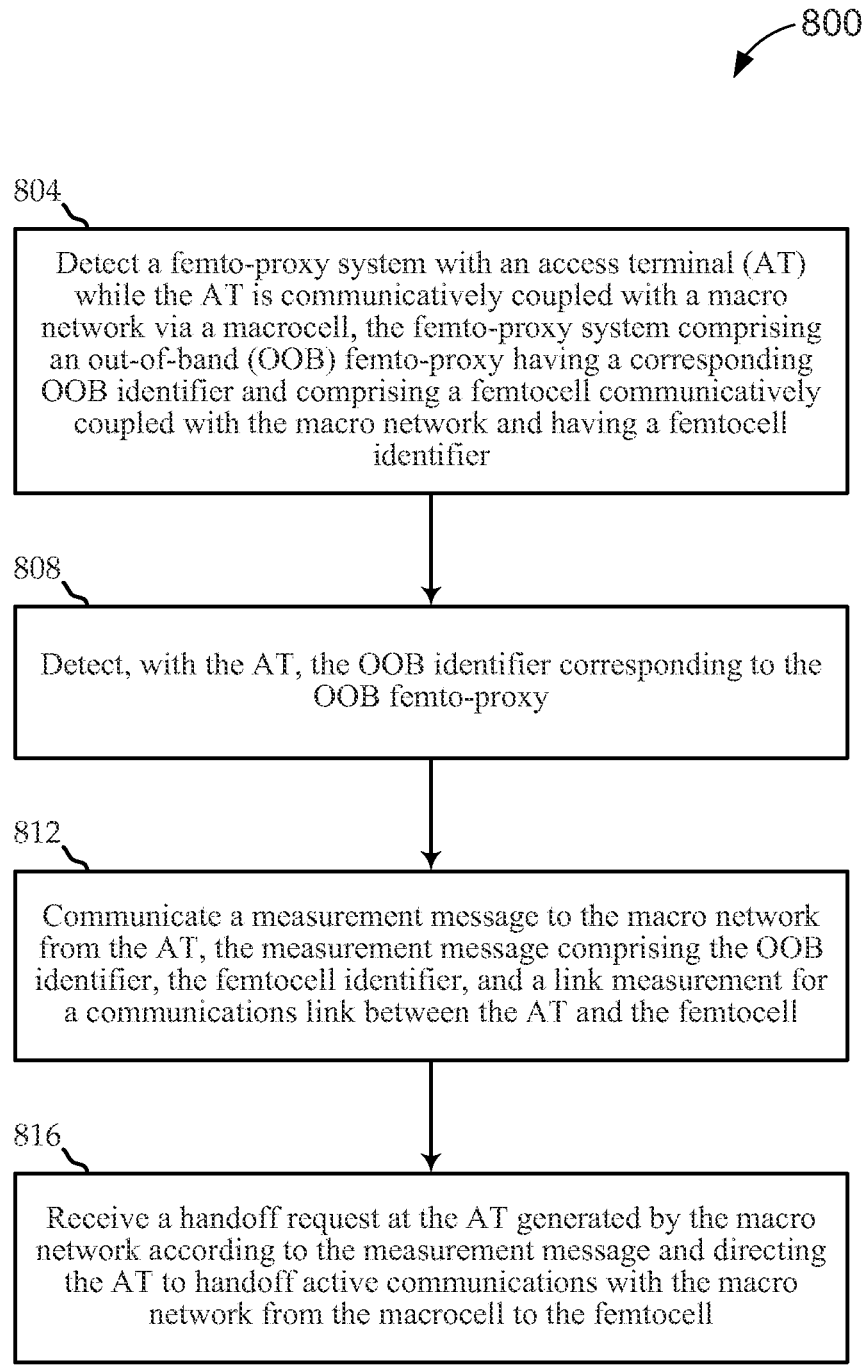
FIG. 8 shows a flow diagram of an exemplary method for facilitating active hand-in using functionality of an access terminal.

Further embodiments of AT 115 assisted hand-in techniques are described below with reference to methods of FIGS. 8 and 9, and the call flow diagram of FIG. 10. Turning first to FIG. 8, a flow diagram is shown of an exemplary method 800 for facilitating active hand-in using functionality of an access terminal. The method 800 begins at stage 804 by detecting a femto-proxy system with an access terminal (AT) while the AT is communicatively coupled with a macro network via a macrocell, the femto-proxy system comprising an out-of-band (OOB) femto-proxy having a corresponding OOB identifier and comprising a femtocell communicatively coupled with the macro network and having a femtocell identifier.

For example, the AT 115 is attached to a macro BTS 105 and is in active macro communications (e.g., in a voice call). The AT 115 moves into proximity of a femto-proxy system 290 having a femtocell (e.g., FAP 230) and an OOB femto-proxy (e.g., femto-proxy module 240). The femtocell is associated with a femtocell identifier (e.g., PN offset), and the OOB femto-proxy is associated with an OOB identifier (e.g., Bluetooth device address, WiFi MAC address, etc.).

At stage 808, the AT detects the OOB identifier corresponding to the OOB femto-proxy. For example, as part of a Bluetooth paging procedure or other OOB detection procedure, an OOB communications link is established, and the AT 115 becomes aware of the OOB identifier of the femto-proxy module 240. The AT 115 may also detect the FAP 230, and determine that a measurement message (e.g., a measurement report) should be communicated.

Notably, aspects of stages 804 and 808 may occur concurrently. For example, the OOB femto-proxy of the femto-proxy system 290 may be detected over the OOB link as part of stage 804 using the OOB identifier detected in stage 808. Accordingly, detection of the femtocell of the femto-proxy system 290 as part of stage 804 may occur over the WWAN link using one or more traditional techniques (e.g., beacon techniques, PUZL method, etc.). The detection of the femtocell over the WWAN link and of the OOB femto-proxy over the OOB link may occur independently (e.g., concurrently, etc.). As discussed above, techniques may be used to encourage OOB detection to occur prior to WWAN detection, for example, by extending the OOB link range beyond the femto range, by decreasing latency of the OOB detection as compared to the femto detection, etc.

At stage 812, the AT communicates a measurement message to the macro network. The measurement message includes the OOB identifier of the OOB femto-proxy, the femtocell identifier of the femtocell, and a link measurement for a communications link between the AT and the femtocell. For example, the AT 115 communicates a measurement report with the identifiers to an MSC 650 via its source macro BTS 105 and/or other macro network 100 elements.

A mapping (e.g., FAP mappings 645) may be maintained at the core network, for example, by a target FCS 640. The mappings associate the OOB identifier indicated by the measurement message from the AT 115 with other identifiers for use in facilitating the active hand-in. For example, the FCS 640 maintains FAP mappings 645 between the OOB identifiers, femtocell identifiers, and another unique identifier by which the FCS 640 can uniquely address the target FAP 230 over a backhaul network.

In some configurations, at stage 816, a handoff request is received at the AT. For example, the handoff request message is generated by the macro network (e.g., the MSC 650) according to the measurement message from the AT 115 and is forwarded to the target FCS 640. After interactions between the target FCS 640 and the target FAP 230, the handoff request message (e.g., or another associated handoff message) is used to direct the AT 115 to handoff active communications with the macro network from the source macrocell (e.g., source macro BTS 105) to the target femtocell (e.g., target FAP 230).

While the method 800 of FIG. 8 discusses various functionality from the perspective of the access terminal (e.g., AT 115), other functionality is apparent from the perspective of components of a network management system 635 (e.g., the FCS 640). FIG. 9 shows a flow diagram of an exemplary method 900 for facilitating active hand-in using functionality of a network management system 635. The method 900 begins at stage 904 by receiving a measurement message at the network management system of a core network. The measurement message is received from an AT 115 communicatively coupled with the core network 630 via a macrocell (e.g., macro BTS 105) of a macro network 100. As discussed above (e.g., with reference to FIG. 8), the measurement message includes an OOB identifier of an OOB femto-proxy, a femtocell identifier of a femtocell, and a link measurement for a communications link between the AT and the femtocell. For example, the femtocell (e.g., FAP 230) is associated with the OOB femto-proxy (e.g., femto-proxy module 240) as part of a femto-proxy system 290.

At stage 908, a determination is made according to the measurement message as to whether to direct the AT to handoff communications from the macrocell to a femtocell. When it is determined not to perform the hand-in, the method 900 may effectively end or perform other techniques outside the scope of this disclosure. Notably, as described above, the measurement message may identify a target femtocell, but in a non-unique way, such that reliable hand-in may involve further determinations.

At stage 912, the femtocell implicated by the measurement message is uniquely identified from a plurality of femtocells in communication with the macro network according to a mapping between the femtocell identifier and the OOB identifier maintained by the network management system. For example, a target FCS 640 in the core network 630 maintains FAP mappings 645. The FAP mappings 645 are used by the target FCS 640 to uniquely identify the target FAP 230, from among multiple FAPs 230 having the same PN offset in a macro sector, according to the OOB identifier and/or the femtocell identifier.

When it is determined to perform the hand-in, a handoff request is communicated from the network management system to the femtocell at stage 916. For example, as part of a handoff procedure, the target FCS 640 sends a handoff request to the uniquely identified target FAP 230 for acknowledgement.

Figure 9:
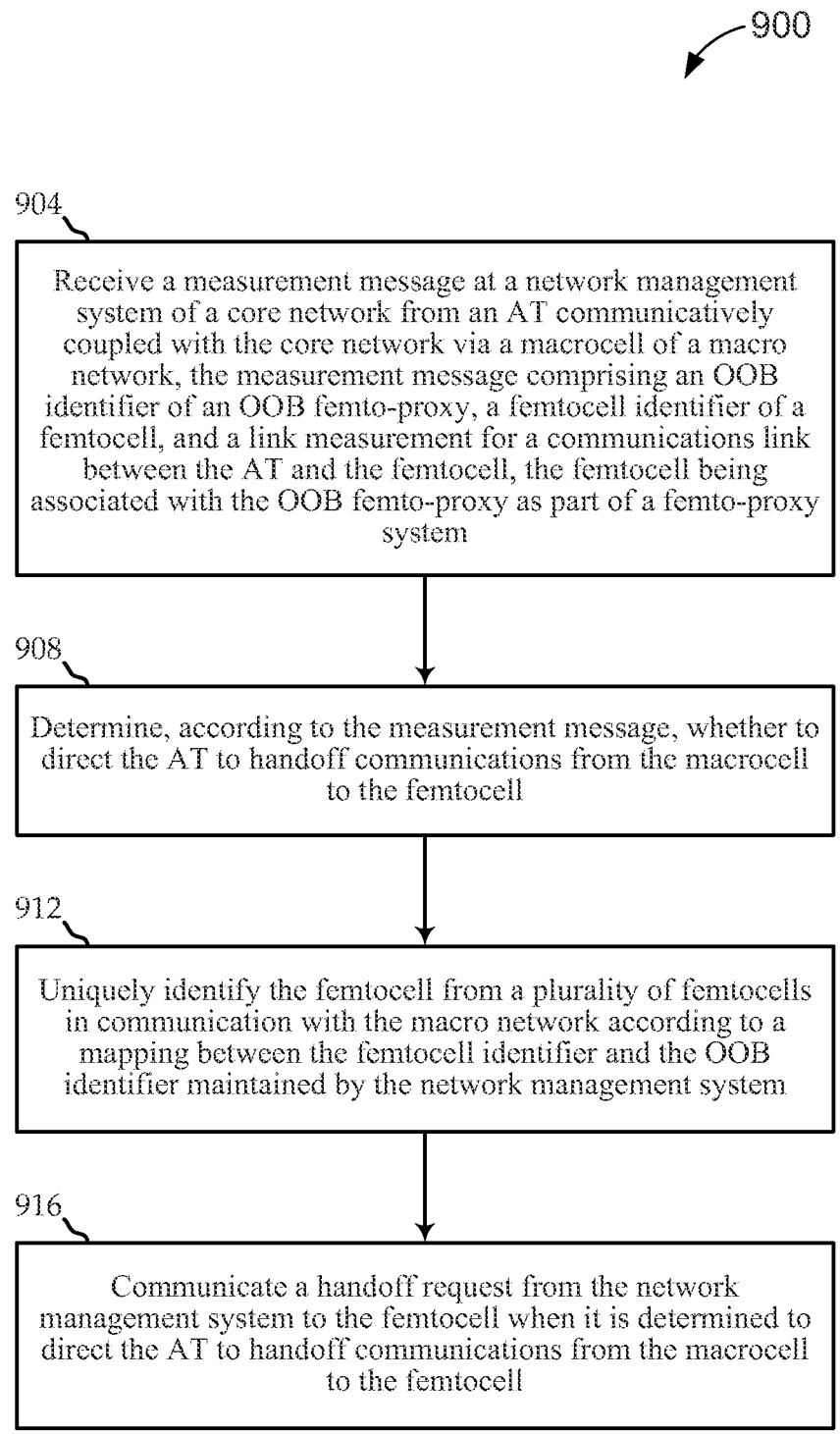
FIG. 9 shows a flow diagram of an exemplary method for facilitating active hand-in using functionality of a network management system.
Figure 10:
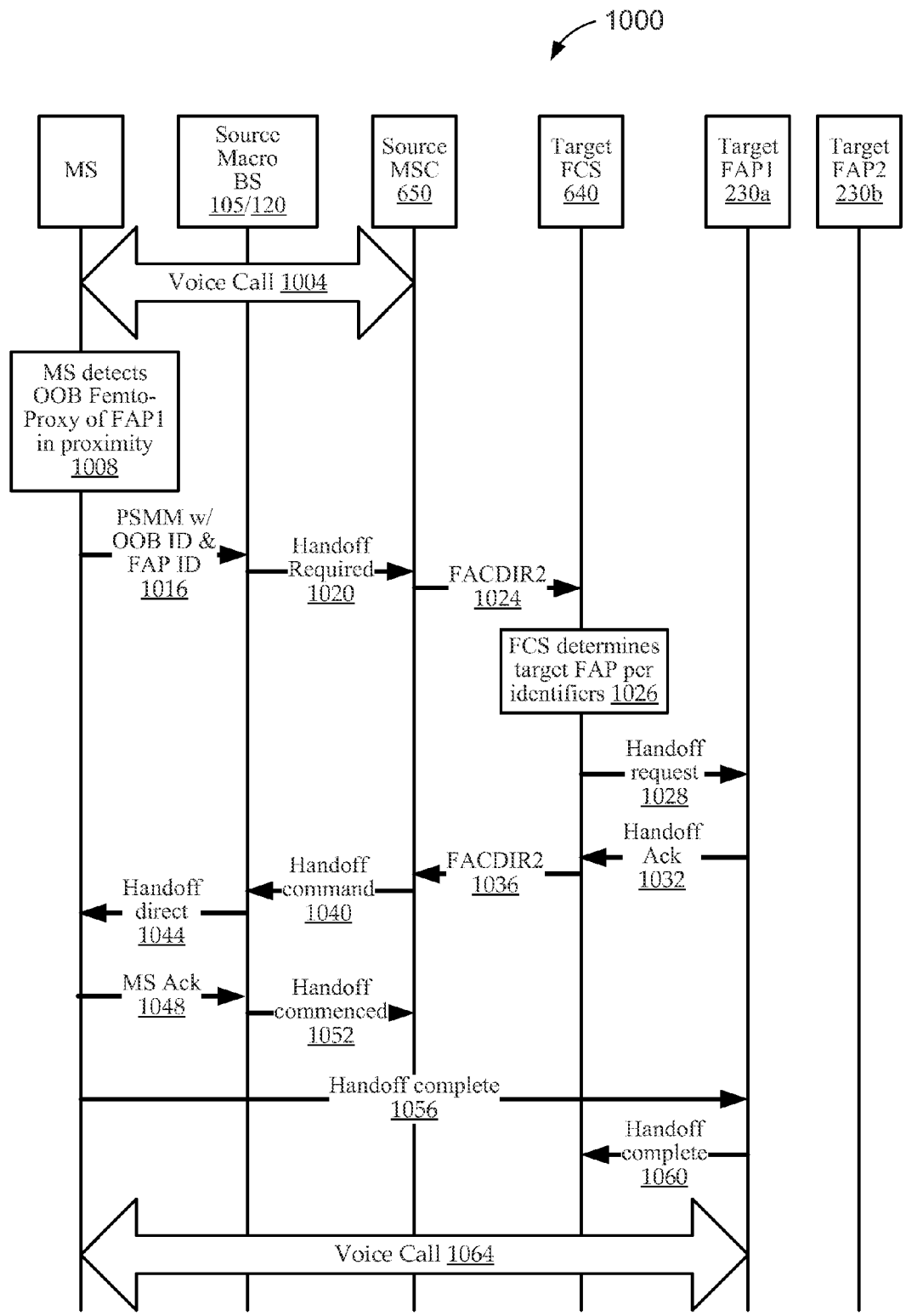
FIG. 10 shows an exemplary call flow diagram illustrating an active hand-in according, for example, to the methods of FIGS. 8 and 9.

An exemplary call flow diagram 1000 illustrating an active hand-in according to the methods 800 and 900 of FIGS. 8 and 9 is shown in FIG. 10. The call flow diagram 1000 shows communications between an MS, a currently connected (source) macro BS 105/120, a source MSC 650, a target FCS 640, and two potential target FAPs 230. For the sake of avoiding excess detail, the source macro BS includes a source macro BTS 105 in communication with a macro BSC 120, and signaling between those elements is not shown. Further, while the techniques illustrated by the call flow diagram 1000 can be used with multiple types of networks, the call flow diagram 1000 is illustrated in the context of a CDMA 1X network. Accordingly, for the sake of clarity, the "MS" terminology is used; though, as described above, techniques described with reference to the MS may be applied in the context of ATs 115 (e.g., or UEs, etc.). It is assumed for the sake of the call flow diagram 1000 that the potential target FAPs 230 have a common cell identifier (e.g., they have the same PN offset). As such, it may be necessary to reliably determine the appropriate one of the potential target FAPs 230 to ensure a successful active hand-in.

The call flow diagram 1000 begins at stage 1004 with the MS currently engaged in an active macro communications, like a voice call or a data call, facilitated by the source MSC 650 via the source macro BS 105/120. At some time, the MS moves into proximity of the OOB femto-proxy 240 associated with a first of the potential target FAPs 230a (e.g., the OOB femto-proxy 240 and the first potential target FAP 230a are integrated into a femto-proxy system 290). At stage 1008, the MS detects the OOB femto-proxy 240 in its proximity (e.g., as in stage 804 of FIG. 8).

At some time thereafter, the MS moves into the femto coverage area of the FAP 230, detects the FAP 230, and sends a measurement report (e.g., PSMM) to the source macro BS 105/120 at stage 1016. The measurement report includes the pilot strength of the FAP 230 as observed by the MS and the PN offset of the FAP 230. As discussed above, the measurement report further includes the OOB identifier (e.g., the Bluetooth device address) of the OOB femto-proxy 240 associated with the FAP 230 (e.g., and detected at stage 1008).

The source macro BS 105/120 determines that a handoff is required according to the measurement report and communicates a handoff required message to the source MSC 650 at stage 1020. At stage 1024, the handoff required message is communicated (e.g., as a FACDIR2 message over the core network) from the source MSC 650 to the target FCS 640. Having received a handoff request, the target FCS 640 now determines which potential target FAP 230 is the correct target for the hand-in. As described above, the target FCS 640 maintains FAP mappings 645 that facilitate unique identification of a target FAP 230 according to the identifiers received as part of the measurement report from the MS.

For example, in this exemplary case, two potential target FAPs 230 have the same PN offset, such that one cannot be uniquely identified by the PN offset alone. Using traditional techniques, as described above, the handoff request may be addressed, for example, by ignoring the hand-in, by blindly selecting one of the potential target FAPs 230, by initiating reverse link sensing at potential target FAPs 230 to detect the MS, etc. However, having received the OOB identifier as part of the measurement report, the target FCS 640 can reliably select the first potential target FAP 230a as the correct target FAP 230 for the hand-in at stage 1026.

At stage 1028, the target FCS 640 sends the handoff request to the first target FAP 230a. The first target FAP 230a responds to the target FCS 640 with a handoff acknowledgement message at stage 1032. The handoff is then communicated to the MS via the core network and the macro network 100. Notably, while referred to generically herein in some instances as "handoff requests" for the sake of simplicity, each related message may, in fact, be of a different form and/or purpose. For example, as illustrated, a handoff acknowledgement may be communicated from the target FCS 640 to the source MSC 650 as a FACDIR2 message at stage 1036; a handoff command may be communicated from the source MSC 650 to the source macro BS 105/120 at stage 1040; and a handoff command may be communicated from the source macro BS 105/120 to the MS at stage 1044.

The handoff process may then commence. For example, at stage 1048, the MS communicates an acknowledgement message to the source macro BS 105/120; and, at stage 1052, the source macro BS 105/120 communicates a handoff commenced message to the source MSC 650. At stage 1056, the MS also communicates a handoff complete message to the first potential target FAP 230a; and the first potential target FAP 230a communicates the handoff complete message to the target FCS 640 at stage 1060. Having completed the hand-in, the MS's active macro communications (e.g., the voice call) continue at stage 1064 facilitated by the appropriately identified target FAP (i.e., previously the first potential target FAP 230a) instead of by the source macro BS 105/120.

It is worth noting that the call flow diagram 1000 is intended to show only an exemplary call flow and is simplified in many ways to add clarity. For example, while a "handoff request" is discussed in a number of stages, it will be appreciated that each element may communicate the message in similar or different forms with similar or different information included. As such, the call flow diagram 1000 should not be construed as limiting the scope of the disclosure or claims.

The various operations of methods described above may be performed by any suitable means capable of performing the corresponding functions. The means may include various hardware and/or software component(s) and/or module(s), including, but not limited to a circuit, an application specific integrate circuit (ASIC), or processor.

The various illustrative logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM, and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The functions described may be implemented in hardware, software, firmware, or any combination thereof. If implemented in software, the functions may be stored as one or more instructions on a tangible computer-readable medium. A storage medium may be any available tangible medium that can be accessed by a computer. By way of example, and not limitation, such computer-readable media can comprise RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material.

Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A method for macrocell-to-femtocell hand-in, the method comprising:
   detecting a signal from a femto-proxy system with an access terminal while the access terminal is communicatively coupled with a macro network via a macrocell, the femto-proxy system comprising an out-of-band (OOB) femto-proxy having a corresponding globally unique OOB identifier and comprising a femtocell communicatively coupled with the macro network and having a femtocell identifier, the signal comprising the OOB identifier, wherein detecting the signal comprises detecting the signal on a predetermined frequency outside of a frequency band on which the femtocell is configured to transmit and receive data and on which the femto-proxy is configured to transmit the OOB identifier;

detecting, with the access terminal, the OOB identifier corresponding to the OOB femto-proxy in the signal from the femto-proxy system; and communicating a measurement message to the macro network from the access terminal, the measurement message comprising the OOB identifier, the femtocell identifier, and a link measurement for a communications link between the access terminal and the femtocell.

2. The method of claim 1, further comprising:
receiving a handoff request at the access terminal from the macro network, the handoff request being generated by the macro network according to the measurement message and directing the access terminal to handoff active communications with the macro network from the macrocell to the femtocell.

3. The method of claim 1, wherein detecting the femto-proxy system with the access terminal comprises detecting the OOB femto-proxy over an OOB communications link.

4. The method of claim 3, wherein the OOB communications link is a Bluetooth link.

5. The method of claim 1, wherein communicating the measurement message to the macro network from the access terminal comprises communicating the measurement message to a femto convergence server in communication with the macro network.

6. The method of claim 1, wherein the femtocell is one of a plurality of femtocells in communication with the macro network and addressable by the macro network according to a non-unique femtocell identifier, such that at least one femtocell identifier corresponds to multiple of the femtocells in communication with the macro network.

7. The method of claim 1, wherein the macro network is configured to maintain, for each of a plurality of femto-proxy systems associated with the macro network, a mapping between the femtocell identifier corresponding to the respective femtocell and the OOB identifier corresponding to the respective OOB femto-proxy.

8. The method of claim 1, wherein the link measurement is a signal strength measurement.

9. The method of claim 1, wherein the femtocell identifier is a PN offset of the femtocell.

10. The method of claim 1, wherein the OOB identifier is a Bluetooth device address of the OOB femto-proxy.

11. The method of claim 1, wherein the OOB identifier is a media access control (MAC) address of the OOB femto-proxy.

12. The method of claim 1 wherein the femto-proxy and the femtocell share at least one antenna.

13. An access terminal comprising:
a macro communications subsystem configured to communicatively couple with a macro network via a macrocell or via a femtocell having a femtocell identifier;
an out-of-band (OOB) communications subsystem, communicatively coupled with the macro communications subsystem, and configured to communicatively couple with an OOB femto-proxy having a globally unique OOB identifier; and
a communications management subsystem, communicatively coupled with the macro communications subsystem and the OOB communications subsystem, and configured to:
detect the signal from the femto-proxy system while the macro communications subsystem is communicatively coupled with the macro network via the macrocell, the femto-proxy system comprising the OOB femto-proxy and the femtocell, wherein the communications management subsystem is configured to detect the signal on a predetermined frequency outside of a frequency band on which the femtocell is configured to transmit and receive data and on which the femto-proxy is configured to transmit the OOB identifier;
detect the OOB identifier corresponding to the OOB femto-proxy in the signal from the femto-proxy system using the OOB communications subsystem; and
communicate a measurement message to the macro network, the measurement message comprising the OOB identifier, the femtocell identifier, and a link measurement for a communications link between the macro communications subsystem and the femtocell.

14. The access terminal of claim 13, the communications management subsystem further configured to:
receive a handoff request from the macro network, the handoff request being generated by the macro network according to the measurement message and directing the communications management subsystem to handoff active communications with the macro network from the macrocell to the femtocell.

15. The access terminal of claim 13, wherein the communications management subsystem is configured to detect the femto-proxy system by detecting the OOB femto-proxy over an OOB communications link using the OOB communications subsystem.

16. The access terminal of claim 13, wherein the femtocell is one of a plurality of femtocells in communication with the macro network and addressable by the macro network according to a non-unique femtocell identifier, such that at least one femtocell identifier corresponds to multiple of the femtocells in communication with the macro network.

17. A processor for macrocell-to-femtocell hand-in in an access terminal, the processor comprising:
a macro communications controller configured to communicatively couple with a macro network via a macrocell or via a femtocell having a femtocell identifier;
an out-of-band (OOB) communications controller, communicatively coupled with the macro communications controller, and configured to communicatively couple with an OOB femto-proxy having a globally unique OOB identifier; and
a communications management controller, communicatively coupled with the macro communications controller and the OOB communications controller, and configured to:
detect the signal from the femto-proxy system while the macro communications controller is communicatively coupled with the macro network via the macrocell, the femto-proxy system comprising the OOB femto-proxy and the femtocell, wherein the communications management controller is configured to detect the signal on a predetermined frequency outside of a frequency band on which the femtocell is configured to transmit and receive data and on which the femto-proxy is configured to transmit the OOB identifier;
detect the OOB identifier corresponding to the OOB femto-proxy in the signal from the femto-proxy system using the OOB communications controller; and
communicate a measurement message to the macro network, the measurement message comprising the OOB identifier, the femtocell identifier, and a link measurement for a communications link between the macro communications controller and the femtocell.

18. The processor of claim 17, the communications management controller further configured to:
receive a handoff request from the macro network, the handoff request being generated by the macro network according to the measurement message and directing the communications management controller to handoff active communications with the macro network from the macrocell to the femtocell.

19. The processor of claim 17, wherein the communications management controller is configured to detect the femto-proxy system by detecting the OOB femto-proxy over an OOB communications link using the OOB communications controller.

20. The processor of claim 17, wherein the femtocell is one of a plurality of femtocells in communication with the macro network and addressable by the macro network according to a non-unique femtocell identifier, such that at least one femtocell identifier corresponds to multiple of the femtocells in communication with the macro network.

21. A computer program product residing on a tangible non-transitory processor-readable medium and comprising processor-readable instructions, which, when executed, cause a processor to perform steps comprising:
detecting a signal from a femto-proxy system with an access terminal while the access terminal is communicatively coupled with a macro network via a macrocell, the femto-proxy system comprising an out-of-band (OOB) femto-proxy having a corresponding globally unique OOB identifier and comprising a femtocell communicatively coupled with the macro network and having a femtocell identifier, the signal comprising the OOB identifier, wherein detecting the signal comprises detecting the signal on a predetermined frequency outside of a frequency band on which the femtocell is configured to transmit and receive data and on which the femto-proxy is configured to transmit the OOB identifier;
detecting, with the access terminal, the OOB identifier corresponding to the OOB femto-proxy in the signal from the femto-proxy system; and
communicating a measurement message to the macro network from the access terminal, the measurement message comprising the OOB identifier, the femtocell identifier, and a link measurement for a communications link between the access terminal and the femtocell.

22. The computer program product of claim 21, the processor-readable instructions, when executed, causing the processor to perform steps further comprising:
receiving a handoff request at the access terminal from the macro network, the handoff request being generated by the macro network according to the measurement message and directing the access terminal to handoff active communications with the macro network from the macrocell to the femtocell.

23. The computer program product of claim 21, wherein detecting the femto-proxy system with the access terminal comprises detecting the OOB femto-proxy over an OOB communications link.

24. The computer program product of claim 21, wherein the femtocell is one of a plurality of femtocells in communication with the macro network and addressable by the macro network according to a non-unique femtocell identifier, such that at least one femtocell identifier corresponds to multiple of the femtocells in communication with the macro network.

25. A system for macrocell-to-femtocell hand-in comprising:
means for detecting a signal from a femto-proxy system with an access terminal while the access terminal is communicatively coupled with a macro network via a macrocell, the femto-proxy system comprising an out-of-band (OOB) femto-proxy having a corresponding globally unique OOB identifier and comprising a femtocell communicatively coupled with the macro network and having a femtocell identifier, the signal comprising the OOB identifier, wherein the means for detecting the signal comprises means for detecting the signal on a predetermined frequency outside of a frequency band on which the femtocell is configured to transmit and receive data and on which the femto-proxy is configured to transmit the OOB identifier;
means for detecting, with the access terminal, the OOB identifier corresponding to the OOB femto-proxy in the signal from the femto-proxy system; and
means for communicating a measurement message to the macro network from the access terminal, the measurement message comprising the OOB identifier, the femtocell identifier, and a link measurement for a communications link between the access terminal and the femtocell.

26. The system of claim 25, further comprising:
means for receiving a handoff request at the access terminal from the macro network, the handoff request being generated by the macro network according to the measurement message and directing the access terminal to handoff active communications with the macro network from the macrocell to the femtocell.

27. The system of claim 25, wherein the means for detecting the femto-proxy system with the access terminal comprises means for detecting the OOB femto-proxy over an OOB communications link.

28. The system of claim 25, wherein the femtocell is one of a plurality of femtocells in communication with the macro network and addressable by the macro network according to a non-unique femtocell identifier, such that at least one femtocell identifier corresponds to multiple of the femtocells in communication with the macro network.

29. A method for macrocell-to-femtocell hand-in, the method comprising:
receiving a measurement message at a network management system of a core network from an access terminal communicatively coupled with the core network via a macrocell of a macro network, the measurement message comprising a globally unique OOB identifier of an OOB femto-proxy configured to transmit a signal comprising the OOB identifier on a predetermined frequency outside of a frequency band on which a femtocell associated with the femto-proxy is configured to transmit and receive data, a femtocell identifier of a femtocell, and a link measurement for a communications link between the access terminal and the femtocell, the femtocell being associated with the OOB femto-proxy as part of a femto-proxy system;
uniquely identifying the femtocell from a plurality of femtocells in communication with the macro network according to a mapping between the femtocell identifier and the OOB identifier maintained by the network management system;
determining, according to the measurement message, whether to direct the access terminal to handoff communications from the macrocell to the femtocell; and
communicating a handoff request from the network management system to the femtocell when it is determined to direct the access terminal to handoff communications from the macrocell to the femtocell.

30. The method of claim 29, wherein the femtocell is physically integrated with the OOB femto-proxy as part of the femto-proxy system.

31. The method of claim 29, further comprising:
receiving an acknowledgement message from the femtocell in response to the handoff request.

32. The method of claim 29, further comprising:
determining whether the femtocell can be uniquely identified by the femtocell identifier alone; and
uniquely identifying the femtocell by the femtocell identifier when the femtocell can be uniquely identified by the femtocell identifier alone,
wherein the femtocell is uniquely identified from the plurality of femtocells of the macro network according to the mapping between the femtocell identifier and the OOB identifier only when the femtocell cannot be uniquely identified by the femtocell identifier alone.

33. The method of claim 29, wherein the network management system comprises a femto convergence server.

34. The method of claim 29, wherein the mapping between the femtocell identifier and the OOB identifier is maintained by the network management system.

35. A network management system disposed in a core network in communication with a plurality of macrocells and a plurality of femtocells, and comprising:
a data storage subsystem configured to maintain, for each of a plurality of femto-proxy systems associated with a macro network in communication with the core network, a mapping between a femtocell identifier corresponding to a femtocell of the femto-proxy system and a globally unique out-of-band (OOB) identifier corresponding to an OOB femto-proxy of the femto-proxy system, wherein each femto-proxy is configured to transmit a signal comprising the OOB identifier on a predetermined frequency outside of a frequency band on which a femtocell associated with the femto-proxy is configured to transmit and receive data; and
a communications management subsystem, communicatively coupled with the data storage subsystem, and configured to:
receive a measurement message from an access terminal communicatively coupled with the macro network via a source macrocell of the plurality of macrocells, the measurement message comprising a target OOB identifier from a signal received from a femto-proxy associated with a target femtocell, a target femtocell identifier associated with the target femtocell, and a link measurement for a communications link between the access terminal and a target femtocell of the plurality of femtocells;
uniquely identify the target femtocell according to the mapping between the target femtocell identifier and the target OOB identifier maintained by the data storage subsystem;
determine, according to the measurement message, whether to direct the access terminal to handoff communications from the source macrocell to the target femtocell; and
communicate a handoff request from the network management system to the target femtocell when it is determined to direct the access terminal to handoff communications from the source macrocell to the target femtocell.

36. The network management system of claim 35, wherein the femtocell identifier is a non-unique identifier that corresponds with multiple of the plurality of femtocells of the macro network.

37. The network management system of claim 35, wherein the network management system of the macro network is a femto convergence system.

38. A processor for macrocell-to-femtocell hand-in in a network management system disposed in a core network communicatively coupled with a plurality of macrocells and a plurality of femtocells, the processor comprising:
a communications management controller, communicatively coupled with a data store configured to maintain, for each of a plurality of femto-proxy systems associated with a macro network, a mapping between a femtocell identifier corresponding to a femtocell of the femto-proxy system and a globally unique out-of-band (OOB) identifier corresponding to an OOB femto-proxy of the femto-proxy system, wherein each femto-proxy is configured to transmit a signal comprising the OOB identifier on a predetermined frequency outside of a frequency band on which a femtocell associated with the femto-proxy is configured to transmit and receive data, the communications management controller configured to:
receive a measurement message from an access terminal communicatively coupled with the macro network via a source macrocell of the plurality of macrocells, the measurement message comprising a target OOB identifier from a signal received from a femto-proxy associated with a target femtocell, a target femtocell identifier associated with the target femtocell, and a link measurement for a communications link between the access terminal and a target femtocell of the plurality of femtocells;
uniquely identify the target femtocell according to the mapping between the target femtocell identifier and the target OOB identifier maintained by the data storage subsystem;
determine, according to the measurement message, whether to direct the access terminal to handoff communications from the source macrocell to the target femtocell; and
communicate a handoff request from the network management system to the target femtocell when it is determined to direct the access terminal to handoff communications from the source macrocell to the target femtocell.

39. The processor of claim 38, wherein the target femtocell identifier is a non-unique identifier that corresponds with multiple of the plurality of femtocells.

40. A computer program product residing on a non-transitory processor-readable medium and comprising processor-readable instructions, which, when executed, cause a processor to perform steps comprising:
receiving a measurement message at a network management system of a core network from an access terminal communicatively coupled with the core network via a macrocell of a macro network, the measurement message comprising a globally unique OOB identifier of an OOB femto-proxy configured to transmit a signal comprising the OOB identifier on a predetermined frequency outside of a frequency band on which a femtocell associated with the femto-proxy is configured to transmit and receive data, a femtocell identifier of a femtocell, and a link measurement for a communications link between the access terminal and the femtocell, the femtocell being associated with the OOB femto-proxy as part of a femto-proxy system;
uniquely identifying the femtocell from a plurality of femtocells of the macro network according to a mapping between the femtocell identifier and the OOB identifier maintained by the network management system;

determining, according to the measurement message, whether to direct the access terminal to handoff communications from the macrocell to the femtocell; and communicating a handoff request from the network management system to the femtocell when it is determined to direct the access terminal to handoff communications from the macrocell to the femtocell.

41. The computer program product of claim 40, the processor-readable instructions, when executed, causing the processor to perform steps further comprising:

receiving an acknowledgement message from the femtocell in response to the handoff request.

42. The computer program product of claim 40, wherein the femtocell identifier is a non-unique identifier that corresponds with multiple of the plurality of femtocells of the macro network.

43. A system for macrocell-to-femtocell hand-in comprising:

means for receiving a measurement message at a network management system of a core network from an access terminal communicatively coupled with the core network via a macrocell of a macro network, the measurement message comprising a globally unique OOB identifier of an OOB femto-proxy configured to transmit a signal comprising the OOB identifier on a predetermined frequency outside of a frequency band on which a femtocell associated with the femto-proxy is configured to transmit and receive data, a femtocell identifier of a femtocell, and a link measurement for a communications link between the access terminal and the femtocell, the femtocell being associated with the OOB femto-proxy as part of a femto-proxy system;

means for uniquely identifying the femtocell from a plurality of femtocells according to a mapping between the femtocell identifier and the OOB identifier maintained by the network management system;

means for determining, according to the measurement message, whether to direct the access terminal to handoff communications from the macrocell to the femtocell; and means for communicating a handoff request from the network management system to the femtocell when it is determined to direct the access terminal to handoff communications from the macrocell to the femtocell.

44. The system of claim 43, wherein the femtocell identifier is a non-unique identifier that corresponds with multiple of the plurality of femtocells of the macro network.

* * * * *